(12) United States Patent
Komatsu et al.

(10) Patent No.: US 9,690,101 B2
(45) Date of Patent: Jun. 27, 2017

(54) VIRTUAL IMAGE DISPLAY APPARATUS

(71) Applicant: SEIKO EPSON CORPORATION, Tokyo (JP)

(72) Inventors: Akira Komatsu, Tatsuno-machi (JP); Takahiro Totani, Suwa (JP); Masayuki Takagi, Matsumoto (JP); Takashi Takeda, Suwa (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 123 days.

(21) Appl. No.: 14/543,413

(22) Filed: Nov. 17, 2014

(65) Prior Publication Data

US 2015/0153574 A1 Jun. 4, 2015

(30) Foreign Application Priority Data

Dec. 3, 2013 (JP) ................................. 2013-249856

(51) Int. Cl.
*G09G 5/00* (2006.01)
*G02B 27/01* (2006.01)
*F21V 8/00* (2006.01)

(52) U.S. Cl.
CPC ....... *G02B 27/0172* (2013.01); *G02B 27/017* (2013.01); *G02B 6/0035* (2013.01);
(Continued)

(58) Field of Classification Search
CPC .............. G02B 27/017; G02B 27/0172; G02B 6/0035; G02B 2027/011; G02B 2027/0123; G02B 2027/0132; G02B 2027/0198
(Continued)

(56) References Cited

U.S. PATENT DOCUMENTS 4,806,011 A * 2/1989 Bettinger ........... G02B 27/0172
351/158
5,812,323 A 9/1998 Takahashi
(Continued)

FOREIGN PATENT DOCUMENTS

JP      H1068887 A    3/1998
JP      2001166209 A  6/2001
(Continued)

OTHER PUBLICATIONS

English Translation of Japanese Patent Application No. JP-B2-4225606.
(Continued)

*Primary Examiner* — Jimmy H Nguyen
(74) *Attorney, Agent, or Firm* — Oliff PLC

(57) ABSTRACT

As a first prism and a second prism respectively have a third surface and a sixth surface, which are reflecting surfaces which are asymmetrical with respect to an axis, inside thereof, it is possible to correct an aberration, and to display an video having high performance. Furthermore, in the first prism, as a plurality of reflecting surfaces (a second surface and the third surface) is provided, it is possible to reduce a size and a weight of the apparatus. Furthermore, like the second surface and a fifth surface, as a surface which functions not only as a light incident surface that causes video light to be incident but also as a total reflecting surface which totally reflects the video light is provided, it is possible to further reduce a size of an optical system.

12 Claims, 19 Drawing Sheets

(52) U.S. Cl.
CPC   *G02B 2027/011* (2013.01); *G02B 2027/0123* (2013.01); *G02B 2027/0198* (2013.01)

(58) Field of Classification Search
USPC .................. 345/8, 84; 359/462, 833, 834
See application file for complete search history.

(56) References Cited

U.S. PATENT DOCUMENTS

| | | | |
|---|---|---|---|
| 5,991,103 A | 11/1999 | Togino | |
| 6,008,948 A | 12/1999 | Togino | |
| 6,317,267 B1 | 11/2001 | Takahashi | |
| 6,396,639 B1* | 5/2002 | Togino | G02B 6/0038 359/301 |
| 6,512,635 B1* | 1/2003 | Takeyama | G02B 27/0172 250/494.1 |
| 6,876,390 B1 | 4/2005 | Nagata | |
| 2003/0107816 A1* | 6/2003 | Takagi | G02B 17/004 359/631 |
| 2004/0119664 A1* | 6/2004 | Inoguchi | G02B 27/0172 345/8 |

FOREIGN PATENT DOCUMENTS

| | | |
|---|---|---|
| JP | 3486468 B2 | 1/2004 |
| JP | 3537230 B2 | 6/2004 |
| JP | 3599828 B2 | 12/2004 |
| JP | 4225606 B2 | 2/2009 |
| JP | 4331290 B2 | 9/2009 |

OTHER PUBLICATIONS

English Translation of Japanese Patent Application No. JP-B2-4331290.

* cited by examiner

VIRTUAL IMAGE DISPLAY APPARATUS

BACKGROUND

1. Technical Field

The present invention relates to a virtual image display apparatus which presents a video formed by an image display element or the like to an observer, and particularly relates to a virtual image display apparatus which is appropriate to a head-mounted display which is mounted on the head of the observer.

2. Related Art

Various technologies have been suggested as an optical system which is embedded in a virtual image display apparatus, such as a head-mounted display (hereinafter, referred to as an HMD), which is mounted on the head of an observer (refer to Japanese Patent No. 3486468, Japanese Patent No. 3537230, Japanese Patent No. 3599828, Japanese Patent No. 4225606, Japanese Patent No. 4331290, JP-A-10-68887, and JP-A-2001-166209).

It is desirable that an apparatus weight be reduced for the virtual image display apparatus, such as the HMD. Since it is advantageous to bend an optical path by using a reflecting surface in order to make the optical system small and reduce the weight, various optical systems which use a prism have been developed. At this time, it is important that the reflecting surface or a refracting surface is a curved surface which is asymmetrical with respect to an axis and an effective aberration correction is performed by using shape flexibility of the curved surface.

For example, in Japanese Patent No. 3486468, Japanese Patent No. 3537230, and Japanese Patent No. 3599828, an optical system, which uses one prism, is illustrated. This type of optical system has an extremely simple configuration and is advantageous in reducing the weight because only one prism is used. However, there are only two reflecting surfaces which are available for the aberration correction in one prism, and thus, the shape flexibility is small, and an optical performance is not sufficient.

In Japanese Patent No. 4225606 and Japanese Patent No. 4331290, an imaging optical system which uses two prisms that is employed in a video camera or the like is illustrated. In the related art, it is known that the imaging optical system can be used as a display optical system which makes a virtual image when a forward direction of a ray of light is reversed into a backward direction. However, in the exemplified imaging optical system, an iris is provided between the two prisms, and cannot be used as the display optical system for the HMD.

In JP-A-10-68887 and JP-A-2001-166209, an optical system, in which two prisms are used and the iris further is disposed on a side of an object of a first prism, is illustrated.

However, in the exemplified imaging optical system and the display optical system for the HMD, specifications, such as a position of the pupil or a size of a display element are different from each other, and it is not easy to directly apply the systems. If the imaging optical system having a configuration in the above-described JP-A-10-68887 and JP-A-2001-166209 is directly applied as the display optical system for the HMD, since a distance from the prism which constitutes the display optical system to the position of the pupil is required to be 10 mm or greater, the prism is extremely large, and is not practical as a small-sized HMD.

SUMMARY

An advantage of some aspects of the invention is to provide a virtual image display apparatus which has a wide angle of view and a high performance, and which reduces a size and a weight of the apparatus.

An aspect of the invention is directed to a virtual image display apparatus including: a video element which generates video light; and a light guiding device including a first light guiding member which emits the video light to an observer side and a second light guiding member which is disposed between the video element and the first light guiding member. In the light guiding device, the first light guiding member and the second light guiding member respectively have one or more reflecting surfaces which are asymmetrical with respect to an axis and one or more total reflecting surfaces. The video light from the video element is emitted from the second light guiding member and is incident on the first light guiding member, after being reflected a plurality of times in the second light guiding member. The first light guiding member has at least three surfaces including a first surface, a second surface, and a third surface, as surfaces which contribute to guiding the video light, reflects the video light incident from the second surface that functions as the above-described total reflecting surface on the third surface that functions as the reflecting surface which is asymmetrical with respect to an axis, totally reflects the video light on the second surface, transmits the video light onto the first surface, and makes the video light reach the eyes of the observer.

In the virtual image display apparatus, as the first and the second light guiding members respectively have one or more reflecting surfaces which are asymmetrical with respect to an axis, it is possible to sufficiently correct the aberration in the optical system which has the reflecting surface inclined to an optical axis, and to display a video having high quality at a wide angle of view. Furthermore, as the first light guiding member has a plurality of reflecting surfaces as surfaces which contribute to guiding the video light, it is possible to reduce the size of the optical system, and further, to reduce the size and the weight of the entire apparatus. At this time, for example, as a surface which functions not only as a light incident surface which causes the video light to be incident, but also as a total reflecting surface which totally reflects the video light, like the second surface among the surfaces which constitute the first light guiding member, it is possible to further reduce the size of the optical system.

In a specific aspect of the invention, a clearance is provided between the second surface which functions as a light incident surface of the first light guiding member and a light emitting surface of the second light guiding member. As the clearance is provided, the total reflection on the second surface of the first light guiding member can be performed.

In another aspect of the invention, the clearance between the second surface which functions as the light incident surface of the first light guiding member and the light emitting surface of the second light guiding member is equal to or greater than 0.1 mm. As the clearance is equal to or greater than 0.1 mm, it is possible to more reliably perform the total reflection on the second surface of the first light guiding member. In addition, an interval between an emitting surface of the first light guiding member and the pupil of an observer may be equal to or greater than 10 mm. As the interval is provided, the face of the observer and the first light guiding member are prevented from being in contact, and contamination of the light guiding member is prevented.

In still another aspect of the invention, the light guiding device makes a virtual image without forming an intermediate image. In this case, as the virtual image is enlarged and displayed to the observer on a divergent type optical path on which the intermediate image is not formed, the design of the optical system is simple compared to a case where the intermediate image is formed.

In yet another aspect of the invention, the second light guiding member has at least three surfaces including a fourth surface, a fifth surface, and a sixth surface, as surfaces which contribute to guiding the video light, reflects the video light incident from the fifth surface which functions as the total reflecting surface on the sixth surface which functions as the reflecting surface which is asymmetrical with respect to an axis, totally reflects the video light on the fifth surface, transmits the video light onto the fourth surface, and causes the video light to be incident on the first light guiding member. In this case, the aberration can be corrected as the sixth surface is the reflecting surface which is asymmetrical with respect to an axis, and the size of the apparatus can be reduced as the fifth surface which functions as the total reflecting surface functions as both a surface which bends the optical path and an inlet (incident surface) of a light flux.

In still yet another aspect of the invention, the second light guiding member has at least four surfaces including the fourth surface, the fifth surface, the sixth surface and a seventh surface, as the surfaces which contribute to guiding the video light, reflects the video light incident from the seventh surface on the sixth surface which functions as the reflecting surface which is asymmetrical with respect to an axis, reflects the video light on the fifth surface which functions as the reflecting surface, transmit the video light onto the fourth surface, and causes the video light to be incident on the first light guiding member. In this case, the aberration can be corrected as the sixth surface is the reflecting surface which is asymmetrical with respect to an axis. As the seventh surface is the reflecting surface which is asymmetrical with respect to an axis, flexibility of the design increases and the optical performance can be improved.

In further another aspect of the invention, in a type which reflects the incident light from the seventh surface on the sixth surface, when an origin of each surface that constitutes the light guiding member is a reference, a y is a direction which is orthogonal to a predetermined symmetrical plane by taking orthogonal coordinates x and y in a straight line direction, and an expression of a z in a surface shape with respect to the x and the y is polynomially expanded, as a coefficient of a term $x^m \cdot y^n$ of the polynomial expression which represents the k-th surface is $Ak_{m,n}$, the following condition, (1) is satisfied.

$$10^{-3} < A3_{0,2} + A3_{2,0} < 10^{-1}, \text{ and}$$

$$10^{-3} < A6_{0,2} + A6_{2,0} < 10^{-1} \quad (1)$$

In this case, as the plurality of surfaces among the surfaces which constitute the first and the second light guiding members is curved surfaces which are asymmetrical with respect to an axis, such as a free-form surface, it is possible to perform the sufficient aberration correction, and the optical system having high image quality is successfully obtained. At this time, a factor which basically characterizes an operation of the curved surface is a curved degree, that is, a curvature of the curved surface. Since the curvature in the vicinity of the origin is mainly determined by a value of the coefficients $Ak_{2,0}$ and $Ak_{0,2}$, it is important to appropriately set the values of the coefficients $Ak_{2,0}$ and $Ak_{0,2}$.

The condition (1) defines the size of the curvature of the third surface and the curvature of the sixth surface in the vicinity of the origin. When the lower limit of the condition (1) is exceeded, the curvature becomes too small, a focal length of the entire system becomes long, and thus, the aberration correction is difficult. In addition, when the upper limit of the condition (1) is exceeded, the curvature becomes too high, the aberration generated on each surface increases, and thus, the aberration correction is difficult. As the condition (1) is satisfied, it is possible to sufficiently perform the aberration correction, and to achieve excellent image quality.

In still further another aspect of the invention, with respect to the coefficient $Ak_{m,n}$ of the polynomial expression, the following condition (2) is satisfied.

$$10^{-4} < |A3_{2,0} - A3_{0,2}| < 10^{-2}, \text{ and}$$

$$10^{-4} < |A6_{2,0} - A6_{0,2}| < 10^{-2} \quad (2)$$

The condition (2) defines a difference between the curvature of an x axis direction and the curvature of a y axis direction of the third surface and the sixth surface. When the lower limit of the condition (2) is exceeded, the astigmatism which is generated on the third surface and the sixth surface becomes too small, the reflecting surface with respect to the optical axis is inclined, and thus, the generated astigmatism correction is difficult. In addition, when the upper limit of the condition (2) is exceeded, the astigmatism which is generated on the third surface and the sixth surface becomes too high, a balance with another aberration is not acquired, and thus, the aberration correction is difficult. As the condition (2) is satisfied, it is possible to correct the aberration which is generated on another surface with an excellent balance.

In yet further another aspect of the invention, the second light guiding member has at least three surfaces including the fourth surface, the fifth surface, and the sixth surface, as surfaces which contribute to guiding the video light, totally reflects the video light incident from the sixth surface on the fourth surface which functions as the total reflecting surface, reflects the video light on the fifth surface which functions as the reflecting surface which is asymmetrical with respect to an axis, transmits the video light onto the fourth surface, and causes the video light to be incident on the first light guiding member. In this case, the aberration can be corrected as the fifth surface is the reflecting surface which is asymmetrical with respect to an axis. As the fourth surface which functions as the total reflecting surface functions as both a surface which bends the optical path and an outlet (emitting surface) of a light flux, the size of the apparatus can be reduced.

In still yet further another aspect of the invention, in a type which totally reflects the incident light from the above-described sixth surface on the fourth surface, when an origin of each surface that constitutes the light guiding member is a reference, a y is a direction which is orthogonal to a predetermined symmetrical plane by taking orthogonal coordinates x and y in a straight line direction, and an expression of a z in a surface shape with respect to the x and the y is polynomially expanded, as a coefficient of a term $x^m \cdot y^n$ of the polynomial expression which represents the k-th surface is $Ak_{m,n}$, the following condition (3) is satisfied.

$$10^{-3} < A3_{0,2} + A3_{2,0} < 10^{-1}, \text{ and}$$

$$10^{-3} < -A5_{0,2} - A5_{2,0} < 10^{-1} \quad (3)$$

In this case, as the plurality of surfaces among the surfaces which constitute the first and the second light guiding members is the curved surfaces which are asymmetrical with respect to an axis, such as a free-form surface, it is possible to perform the sufficient aberration correction, and the optical system having high image quality is successfully obtained. At this time, a factor which basically characterizes an operation of the curved surface is the curved degree, that is, the curvature of the curved surface. Since the curvature in the vicinity of the origin is mainly determined by a value of the coefficients $Ak_{2,0}$ and $Ak_{0,2}$, it is important to appropriately set the values of the coefficients $Ak_{2,0}$ and $Ak_{0,2}$.

The condition (3) defines the size of the curvature of the third surface and the curvature of the fifth surface in the vicinity of the origin. When the lower limit of the condition (3) is exceeded, the curvature becomes too small, a focal length of the entire system becomes long, and thus, the aberration correction is difficult. In addition, when the upper limit of the condition (3) is exceeded, the curvature becomes too high, the aberration generated on each surface increases, and thus, the aberration correction is difficult. As the condition (3) is satisfied, it is possible to sufficiently perform the aberration correction, and to achieve excellent image quality.

In a further aspect of the invention, with respect to the coefficient $Ak_{m,n}$ of the polynomial expression, the following condition (4) is satisfied.

$$10^{-4} < |A3_{2,0} - A3_{0,2}| < 10^{-2}, \text{ and}$$

$$10^{-4} < |A5_{2,0} - A5_{0,2}| < 10^{-2} \quad (4)$$

The condition (4) defines a difference between the curvature of an x axis direction and the curvature of a y axis direction of the third surface and the fifth surface. When the lower limit of the condition (4) is exceeded, the astigmatism which is generated on the third surface and the fifth surface becomes too small, the reflecting surface is inclined, and thus, the generated astigmatism correction is difficult. In addition, when the upper limit of the condition (4) is exceeded, the astigmatism which is generated on the third surface and the fifth surface becomes too high, a balance with another aberration is not acquired, and thus, the aberration correction is difficult. As the condition (4) is satisfied, it is possible to correct the aberration which is generated on another surface with an excellent balance.

In a still further aspect of the invention, in the first light guiding member, the third surface which functions as the reflecting surface which is asymmetrical with respect to an axis is an aluminum vapor deposition surface. In this case, it is possible to simply and reliably form a reflecting surface which is asymmetrical with respect to an axis having a desired reflectivity.

In a yet further aspect of the invention, the entire optical system including the first light guiding member and the second light guiding member covers a part of the front of the eyes of the observer when the apparatus is mounted, and allows a part in which the front of the eyes is not covered to exist.

In a still yet further aspect of the invention, the video element includes: a signal light forming portion which emits modulated signal light corresponding to an image; and a scanning optical system which emits the signal light which is incident from the signal light forming portion as scanning light by scanning the signal light.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, with reference to FIG. 1 or the like, a virtual image display apparatus according to a first embodiment of the invention will be described in detail.

Figure 1:
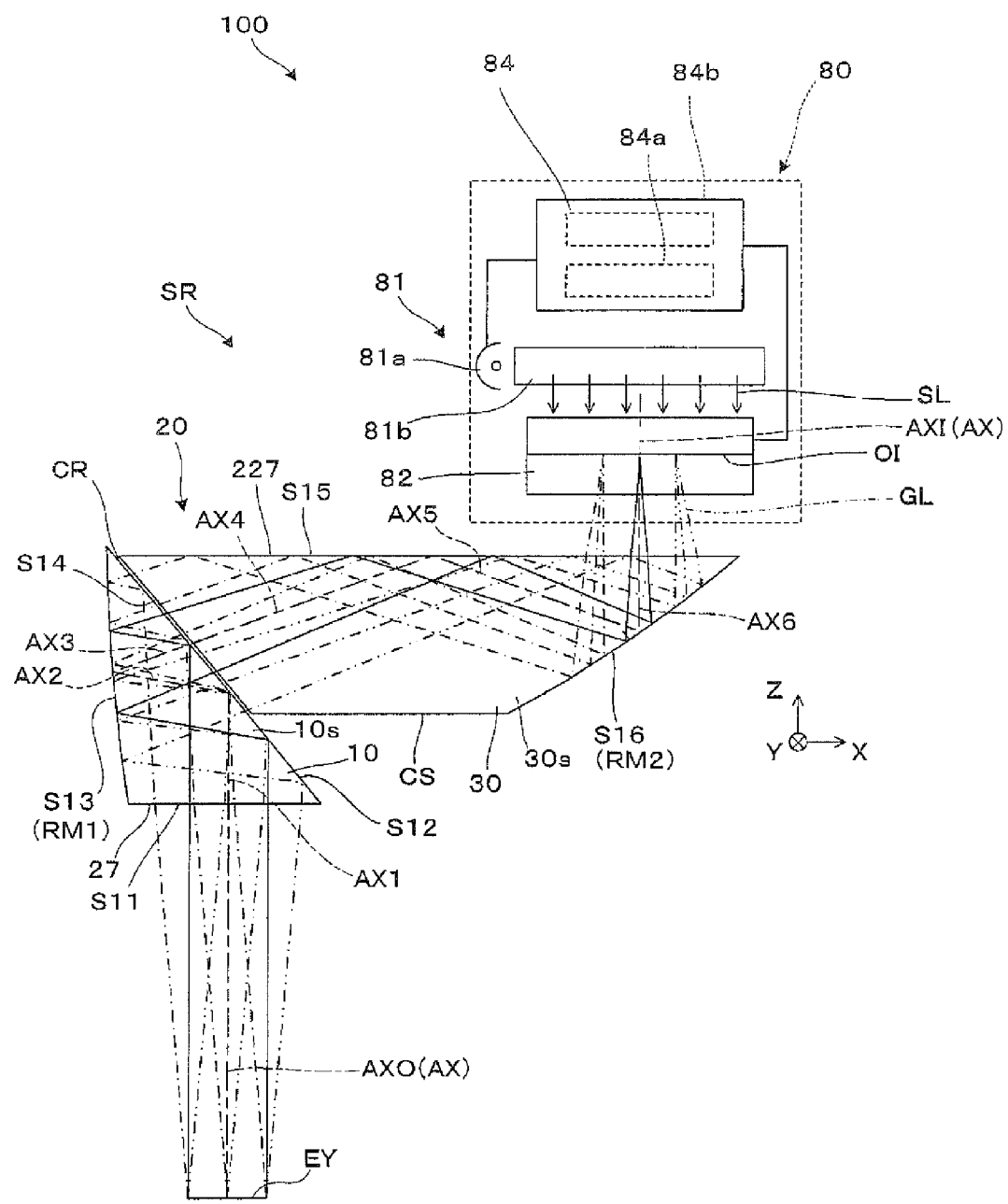
FIG. 1 is a cross-sectional view in a planar view of a main body part of a first display device which constitutes the virtual image display apparatus according to an embodiment.

A virtual image display apparatus 100 of the embodiment illustrated in FIG. 1 is employed in a head-mounted display (HMD), and includes an image display device 80 and a light guiding device 20 as one group.

Figure 3:
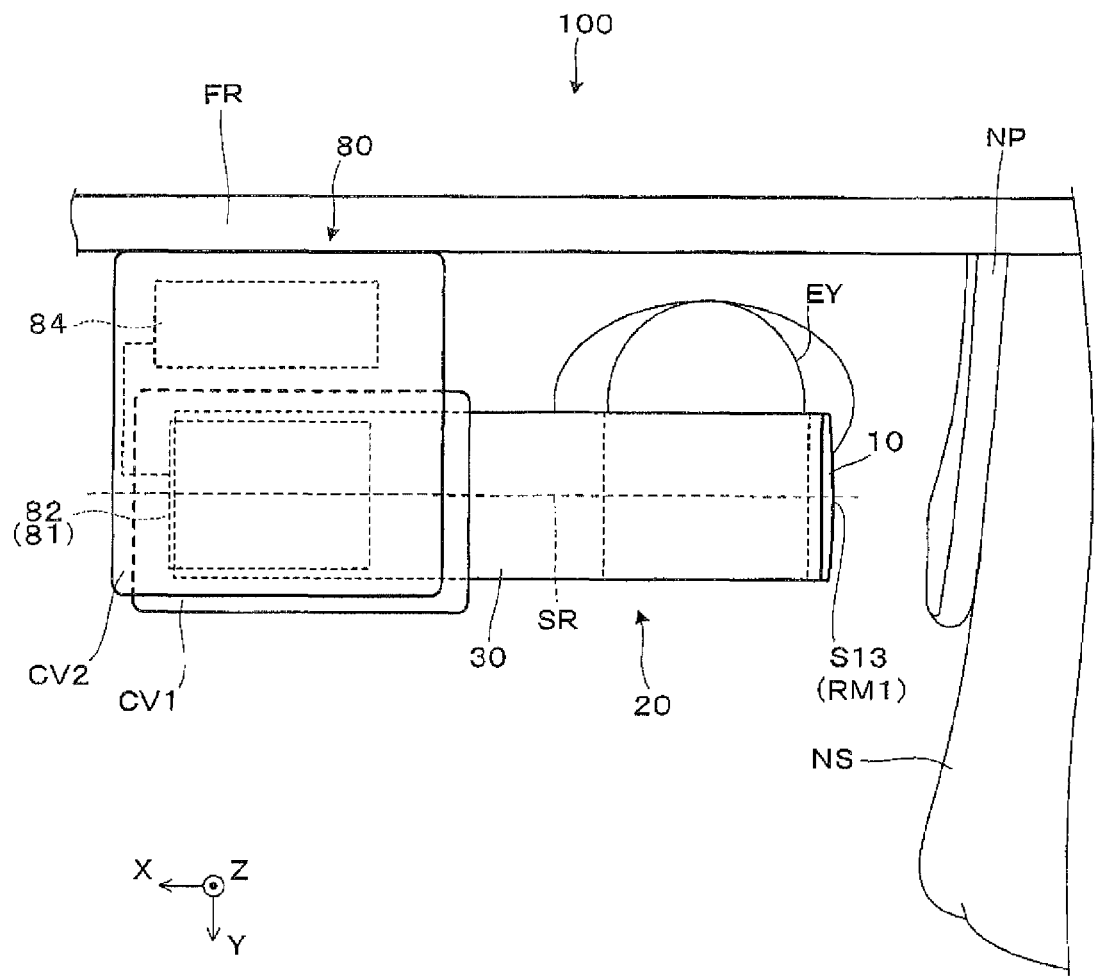
FIG. 3 is a schematic front view illustrating a state where the virtual image display apparatus is mounted.

The virtual image display apparatus 100 makes an observer recognize an image by forming a virtual image by image light. The image display device 80 and the light guiding device 20 are usually disposed in front of either of the right and the left eyes of the observer, or in front of both eyes. However, a case where the apparatus is for the right eye is illustrated here, and the drawings and description of the virtual image display apparatus for the left eye will be omitted because the virtual image display apparatus for the left eye is merely a horizontally reversed version of the virtual image display apparatus for the right eye. In addition, for example, as illustrated in FIG. 3, the entire virtual image display apparatus 100 has an external appearance in which a small-sized apparatus is installed in a frame of general glasses.

Hereinafter, with reference to FIG. 1, functions, operations, or the like related to the image display device 80 and the light guiding device 20 will be described in detail. In addition, FIG. 1 illustrates a cross section of a reference surface SR including an optical axis AX of an optical system in the virtual image display apparatus 100.

The image display device 80 includes: a lighting device 81 which emits illumination light; a video display element 82 which is a transmission type spatial light modulation device; and a driving control portion 84 which controls the operation of the lighting device 81 and the video display element 82.

The lighting device 81 of the image display device 80 includes: a light source 81a which generates three colors, such as red, green, and blue; and a backlight light guiding portion 81b which disperses light from the light source and makes the light into a light flux of a rectangular cross section. The video display element (video element) 82 forms the image light which is formed, for example, by a liquid crystal display device, which is configured by a plurality of pixels, and which is supposed to be a display target of a moving image or the like by spatially modulating the illumination light from the lighting device 81. The driving control portion 84 is provided with a light source driving circuit 84a and a liquid crystal driving circuit 84b. The light source driving circuit 84a supplies electric power to the lighting device 81 and emits the illumination light having a stabilized luminance. The liquid crystal driving circuit 84b forms the video light or the image light having colors which are bases of the moving image or a still image as a transmittance pattern, by outputting an image signal or a driving signal with respect to the video display element (video element) 82. Here, it is possible to give an image processing function to the liquid crystal driving circuit 84b, but it is also possible to give the image processing function to an external control circuit. In addition, a projecting optical axis (emitting optical axis) in the image display device 80 is an incident side optical axis AXI with respect to the light guiding device 20.

The light guiding device 20 is a prism type member which emits the video light emitted from the image display device 80 toward the eyes EY of the observer, and is provided with a first prism 10 which is a first light guiding member and a second prism 30 which is a second light guiding member.

In addition, in the first prism 10 and the second prism 30, main bodies 10s and 30s of each of the prisms 10 and 30 are respectively formed of a resin material which shows a high optical transparency in a visible area. For example, the main bodies 10s and 30s are formed by injecting a thermoplastic resin into a mold and hardening the thermoplastic resin. In addition, as a material of the main bodies 10s and 30s, it is possible to use a cycloolefin polymer or the like.

The first prism 10 is a prism type member in a triangular parallelepiped shape having a curved surface at a part thereof, is the first light guiding member which constitutes a part of a tip end side, among the light guiding members that constitute the light guiding device 20, and is disposed on a side relatively close to the nose when the apparatus is mounted.

The first prism 10 has a first surface S11, a second surface S12, and a third surface S13, as side surfaces having an optical performance when the light is guided, that is, as surfaces which contribute to guiding the light. As the surfaces are sequentially adjacent to each other while facing each other having a certain extent of an angle, the side surface in a triangle parallelepiped shape is formed.

The second prism 30 is a prism type member in a rectangular parallelepiped shape having a curved surface at a part thereof, is the second light guiding member which constitutes a base part, that is, a part between the video display element (video element) 82 and the first prism 10 (first light guiding member), among the light guiding members which constitute the light guiding device 20, and is disposed on a side relatively far from the nose when the apparatus is mounted. The second prism 30 causes the video light from the video display element 82 to be incident, guides the video light on the inside, and emits the video light toward the first prism 10.

The second prism 30 has a fourth surface S14, a fifth surface S15, a sixth surface S16, and a connection surface CS as side surfaces having an optical performance when the light is guided, that is, as surfaces which contribute to guiding the light. Among the surfaces, the fourth surface S14 and the fifth surface S15 are sequentially adjacent to each other, and the fifth surface S15 and the sixth surface S16 are sequentially adjacent to each other. In addition, the connection surface CS is a surface which connects the fourth surface S14 and the sixth surface S16 to each other, but is a side surface which does not have an optical performance when the light is guided. As the surfaces are sequentially adjacent to each other while facing each other having a certain extent of an angle, the side surface in a rectangular parallelepiped shape is formed.

Here, in the light guiding device 20, a slight clearance CR is provided between the first prism 10 and the second prism 30. More specifically, the second surface S12 which is the light incident surface of the first prism 10 and the fourth surface S14 which is the light emitting surface of the second prism 30, are surfaces which face each other and extend in parallel or substantially in parallel. However, between the surfaces, the slight clearance CR is formed and disposed. As the clearance CR is provided, the total reflection of the video light on the second surface S12 which will be described later is possible.

Hereinafter, each surface which constitutes the first prism 10 will be described in detail. In the first prism 10, the first surface S11 is a plane which has an emitting side optical axis AXO that is parallel to a Z axis as a central axis. The second surface S12 is a plane which is orthogonal to a bisector between an optical axis AX1 and an optical axis AX2 which are included in the reference surface SR (cross section in the drawing) parallel to an XZ surface. The third surface S13 is a free-form surface which has a bisector between the optical axis AX2 and an optical axis AX3 which are included in the reference surface SR parallel to the XZ surface. In addition, the first to the third surfaces S11 to S13 described above have a shape which is symmetrical with respect to the reference surface SR through which the optical axes AX1 to AX3 pass in parallel to the XZ surface.

In the first prism 10, the first surface S11 functions as a refracting surface which emits video light GL to the outside of the light guiding device 20. In addition, the first surface S11 is a surface which is formed by a hard coat layer 27 implemented on a surface of the main body 10s.

The second surface S12 functions as the light incident surface which causes the video light GL to be incident in the first prism 10 and as the total reflecting surface which totally reflects the video light GL on an inner surface side. In addition, the second surface S12 is a surface which is formed by a hard coat layer 27 implemented on a surface of the main body 10s.

The third surface S13 has a curved surface shape which is asymmetrical with respect to an axis, and functions as the reflecting surface which is asymmetrical with respect to an axis which reflects the video light GL on the inner surface side. The third surface S13 is formed by forming a light reflecting film RM1 formed of an inorganic material on the surface of the main body 10s. Here, as an example, aluminum is used as the inorganic material. In other words, the third surface S13 which is the reflecting surface which is asymmetrical with respect to an axis is an aluminum vapor deposition surface formed by aluminum evaporation.

Hereinafter, each surface which constitutes the second prism 30 will be described in detail. In the second prism 30, the fourth surface S14 is a plane which has an optical axis AX4 included in the reference surface SR as the central axis. The fifth surface S15 is a plane which is orthogonal to a bisector between a pair of optical axes AX4 and AX5 included in the reference surface SR. The sixth surface S16 is a free-form surface which has a bisector between a pair of optical axes AX5 and AX6 included in the reference surface SR as the central axis.

In the second prism 30, the fourth surface S14 functions as the light emitting surface which emits the video light GL toward the first prism 10. In addition, the fourth surface S14 is a surface which is formed by a hard coat layer 227 implemented on a surface of the main body 30s.

The fifth surface S15 functions as the light incident surface which causes the video light GL from the image display device 80 to be incident in the second prism 30 and as the total reflecting surface which totally reflects the video light GL on the inner surface side. In addition, the fifth surface S15 is a surface which is formed by a hard coat layer 227 implemented on a surface of the main body 30s.

The sixth surface S16 functions as the reflecting surface which reflects the video light GL on the inner surface side. More specifically, the sixth surface S16 is formed by forming a light reflecting film RM2, for example, by aluminum evaporation, on the surface of the main body 30s.

In addition, the above-described fourth to sixth surfaces S14 to S16 have a shape which is symmetrical with respect to the reference surface SR through which the optical axes AX4 to AX6 or the like pass in parallel to the XZ surface.

Hereinafter, an optical path of the video light GL in the virtual image display apparatus 100 will be described. The video light GL from the video display element (video element) 82 is incident on the fifth surface S15 provided in the second prism 30 in the light guiding device 20.

The video light GL which is incident on the fifth surface S15 of the second prism 30 and passes through the fifth surface S15, advances while being radiated and is reflected on the sixth surface S16 having a positive refracting power.

The video light GL which is reflected on the sixth surface S16 is incident on the fifth surface S15 again. Here, the sixth surface S16 and the fifth surface S15 have an appropriate angle, and the video light GL which is reflected by the sixth surface S16 is totally reflected. The video light GL which is totally reflected on the fifth surface S15 is emitted toward the first prism 10 from the fourth surface S14.

The video light GL which is emitted from the second prism 30 is incident on the second surface S12 provided in the first prism 10, and is reflected on the third surface S13 having a positive refracting power.

The video light GL which is reflected on the third surface S13 is incident on the second surface S12 again. In addition, as described above, between the second surface S12 and the fourth surface S14, a clearance CR is provided and an air layer is formed. Accordingly, the second surface S12 totally reflects the video light GL. The video light GL which is totally reflected on the second surface S12 is emitted toward the eyes EY of the observer from the first surface S11. In addition, if it is possible to maintain a state where the video light GL is guided, such as a state where the total reflection is maintained on the second surface S12, a part of the clearance CR may be filled with a material having a low refractive index close to that of air, for example. In other words, not being limited to a case where the air layer is formed between the second surface S12 and the fourth surface S14, a space which is provided in a state where an object is nipped is also included in the clearance CR.

The video light GL which passes through the first surface S11 is incident as a light flux which is substantially parallel to the pupil of the eyes EY of the observer or to a position that is equivalent thereto. In other words, the observer observes an image formed on the video display element (video element) 82 by the video light GL as a virtual image. In addition, from being incident on the fifth surface S15 until being emitted from the first surface S11, the video light GL is guided directly toward the eyes of the observer without forming the intermediate image in the light guiding device 20.

Figure 2:
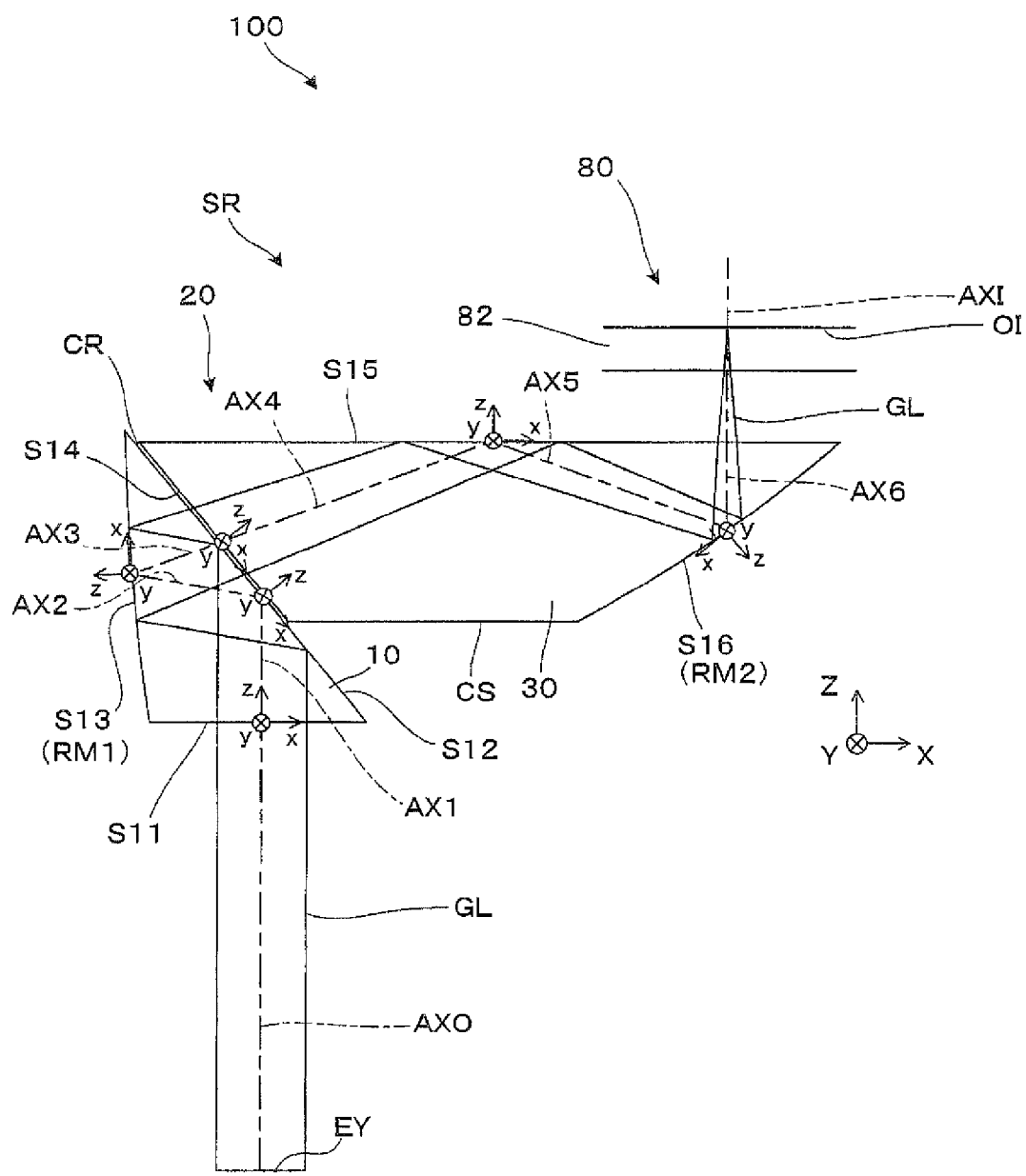
FIG. 2 is a cross-sectional view illustrating an optical surface or an optical path in a light guiding member in the virtual image display apparatus.

FIG. 2 is a view illustrating the optical axes AX1 to AX6 in the first prism 10 and the second prism 30 or local coordinates. In the description below, considering convenience of evaluation or expression of the optical system, in a backward direction toward the video display element 82 of the image display device 80 from the eyes EY of the observer, the optical surface or the optical path is defined. In a real optical system, the light generated from the video display element 82 passes through the inside of the light guiding device 20, that is, the inside of the second prism 30 and the first prism 10, sequentially, and reaches the eyes EY. However, in this state, it is difficult to evaluate the optical system. For this reason, the light from an infinitely distant light source through an iris which is at a position of the eyes EY is evaluated and designed as the light which forms an image in the video display element 82 through the first prism 10 and the second prism 30, and data of the optical system described below is also displayed sequentially.

First, in the first prism 10 of the light guiding device 20 illustrated in the drawing, the optical axis AX1 of the first surface S11 matches the emitting side optical axis AXO, and local coordinates (x, y, z) of the first surface S11 are in a translational relationship with general coordinates (X, Y, Z), and have an origin on the first surface S11. In other words, a z direction of the local coordinates is on the emitting side optical axis AXO, and is a forward direction (backward direction of the ray of light). A y direction of the local coordinates is parallel to a Y direction of the general coordinates. Even in each of the following drawings, the y direction of the local coordinates is parallel to the Y direction of the general coordinates.

The optical axis of the second surface S12 is appropriately inclined with respect to the emitting side optical axis AXO. The local coordinates of the second surface S12 appropriately rotate around the Y axis with respect to the general coordinates, move translationally, and have the origin on the second surface S12. The z axis of the local coordinates of the second surface S12 is a bisector between the emitting side optical axis AXO (optical axis AX1) and the optical axis AX2 of the center of the light flux from the second surface S12 toward the third surface S13.

The origin of the local coordinates of the third surface S13 is on the third surface S13. In addition, the z direction of the local coordinates of the third surface S13 is a bisector between the optical axis AX2 of the center of the light flux from the second surface S12 toward the third surface S13 and the optical axis AX3 of the center of the light flux from the third surface S13 toward the second surface S12 which functions as the light incident surface.

Next, in the second prism 30 in the light guiding device 20 illustrated in the drawings, the origin of the local coordinates of the fourth surface S14 is on the fourth surface S14. In addition, the z direction of the local coordinates of the fourth surface S14 is parallel to a direction of the z axis of the second surface S12. In addition, the y direction of the local coordinates is parallel to the Y direction of the general coordinates.

The origin of the local coordinates of the fifth surface S15 is on the fifth surface S15. In addition, the z direction of the local coordinates of the fifth surface S15, that is, the optical axis of the fifth surface S15, is a bisector between the optical axis AX4 of the center of the light flux from the fourth surface S14 toward the fifth surface S15 and the optical axis AX5 of the center of the light flux from the fifth surface S15 toward the sixth surface S16.

The origin of the local coordinates of the sixth surface S16 is on the sixth surface S16. In addition, the z direction of the local coordinates of the sixth surface S16, that is, the optical axis of the sixth surface S16, is a bisector between the optical axis AX5 of the center of the light flux from the fifth surface S15 toward the sixth surface S16 and the optical axis AX6 of the center of the light flux from the sixth surface S16 toward the fifth surface S15 which functions as the light incident surface. In addition, the optical axis AX6 matches the incident side optical axis AXI which is the optical axis of the entire light guiding device 20.

The shape of the third surface S13 of the first prism 10 can be expressed using the local coordinates (x, y, z) of the third surface S13 as follows.

$$z = \Sigma \{A3_{m,n} \cdot (x^m y^n)\} \quad (5)$$

Here, $A3_{m,n}$ is represented by a coefficient of the m·n term which is polynomially expanded.

In addition, the shape of the sixth surface S16 of the second prism 30 can be expressed using the local coordinates (x, y, z) of the sixth surface S16 as follows.

$$z = \Sigma \{A6_{m,n} \cdot (x^m y^n)\} \quad (6)$$

Here, $A6_{m,n}$ is represented by a coefficient of the m·n term which is polynomially expanded.

In the embodiment, the third surfaces S13 of the first prism 10 and the sixth surface S16 of the second prism 30 satisfies the following two conditions.

$$10^{-3} < A3_{0,2} + A3_{2,0} < 10^{-1} \text{ and}$$

$$10^{-3} < A6_{0,2} + A6_{2,0} < 10^{-1} \quad (1)$$

$$10^{-4} < |A3_{2,0} - A3_{0,2}| < 10^{-2} \text{ and}$$

$$10^{-4} < |A6_{2,0} - A6_{0,2}| < 10^{-2} \quad (2)$$

As the shape of the first to the sixth surfaces S11 to S16 is set to satisfy the two conditions, it is possible to perform the correction of the aberration of the video light GL well, and to achieve an excellent image quality.

In addition, in the above-described example, since surfaces other than the third surface S13 and the sixth surface S16 (first surface S11 or the like) are in a planar shape, and any of the above-described coefficients only becomes zero, the detailed description thereof will be omitted. In addition, in each example which will be described later, on each surface of the prism which is not in a planar shape, similarly to a case of third surface S13 or the sixth surface S16, the coefficient $Ak_{m,n}$ of the m·n term which is polynomially developed with respect to the k-th surface can be defined.

As described above, in the embodiment, the first prism 10 and the second prism 30 which are the first and the second light guiding members respectively have the third surface S13 and the sixth surface S16 which are the reflecting surfaces which are asymmetrical with respect to an axis, inside thereof. According to this, it is possible to sufficiently correct the aberration in the optical system which is asymmetrical with respect to an axis, and to display an image having high quality. Furthermore, in the first prism 10, as a plurality of reflecting surfaces (the second surface S12 and the third surface S13) is provided as surfaces which contribute to guiding the video light, it is possible to reduce the size of the optical system, and thus, to reduce the size and the weight of the entire apparatus. At this time, for example, like the second surface S12 and the fifth surface S15 among the surfaces which constitute the first prism 10 and the second prism 30, as a surface which functions not only as the light incident surface that causes the video light GL to be incident but also as the total reflecting surface which totally reflects the video light GL is provided, it is possible to further reduce the size of the optical system. In addition, the surface which enlarges and displays the video light to observer on the divergent type optical path on which the intermediate image is not formed, and the design of the optical system is simple compared to a case where the intermediate image is formed.

In addition, as an example is schematically illustrated in FIG. 3, in the light guiding device 20, a state where the apparatus is mounted becomes a state where a part of the first prism 10 and the entire second prism 30 are covered with a first protecting member CV1, each part of the image display device 80 is covered with a second protecting member CV2 which is linked to the first protecting member CV1, and the second protecting member CV2 is supported by a frame portion FR. In addition, regarding the supporting and fixing of the frame portion FR or the like in mounting the apparatus, for example, as illustrated in the drawing, as the virtual image display apparatus 100 has a structure in which a nose reception portion NP which extends in a perpendicular direction with respect to the frame portion FR is provided, the apparatus may be supported by the nose NS of the observer. Furthermore, although not illustrated in the drawing, as a spring structure for applying an energizing force or a hook structure for hooking the apparatus to a part of a human body is provided in the frame portion FR, the apparatus may be installed and fixed to the head or the ear of a wearer. In addition, as illustrated in the drawing, as can be found from the position of the eyes EY or the nose NS of the observer, the virtual image display apparatus 100 may be disposed slightly further downward than the center of the eyes. In this case, by setting a sight angle in a relaxed state when the observer closes the eyes, it is possible to adjust to observe in a state where a direction (sight line) of an eye line of the observer with respect to the video is naturally a side downward to the observer.

In a case illustrated in FIG. 3, in the light guiding device 20, the first prism 10 disposed at a part in front of the eyes covers the front of the eyes EY, that is, a part of the front of the eyes of the observer when the apparatus is mounted, and has a part in which the front of the eyes is not covered. In this case, the observer can observe the environment from the vicinity of the light guiding member.

EXAMPLES

Hereinafter, examples of the light guiding device including a first prism and a second prism embedded in the virtual image display apparatus according to the invention will be described. Symbols used in each example are as follows. In addition, the global coordinate system has a symbol EP which illustrates the position of the pupil as a reference position, that is, an absolute origin with respect to the whole, and means a coordinate system (XYZ coordinate system) with regard to an X axis, a Y axis, and a Z axis which are the whole axes. Each free-form surface which constitutes the light guiding member has the global coordinate system as a reference, and illustrates an origin of the local coordinates in a relative positional relationship. In addition, a direction of the z axis (local z axis) of local coordinates of each surface is represented by an angle θ around the Y axis with respect to the Z axis of the global coordinate system.

EP: Pupil
FFSk: Free-form surface (k=surface number, but a plane is included at a part thereof)
PLANE: Plane
IMAGE: Image surface of video display element
X: X coordinate value in the global coordinate system of the origin of the local coordinate system of each surface
Y: Y coordinate value in the global coordinate system of the origin of the local coordinate system of each surface
Z: Z coordinate value in the global coordinate system of the origin of the local coordinate system of each surface
θ: Rotation angle)(°) around the Y axis with respect to the global coordinate system of the local coordinate system of each surface
Nd: Refractive index with respect to a d line of an optical material
Vd: Abbe number in the d line of the optical material Example 1

Data of an optical surface which constitutes the light guiding member in Example 1 is illustrated in Table 1 described below. Here, the light ray which moves backward with respect to the forward movement of the video light from the position of the eyes (symbol EP) is tracked and measured. The symbol FFSk (k=1 to 6) means the k-th surface among the first to the sixth surfaces S11 to S16. In other words, for example, an FFS1 means the first surface S11, an FFS2 means the second surface S12, and an FFS3 means the third surface S13.

TABLE 1

| No | Type  | X      | Y     | Z      | θ      | Nd    | Vd    |
|----|-------|--------|-------|--------|--------|-------|-------|
| 1  | EP    | 0.000  | 0.000 | 0.000  | 0.00   |       |       |
| 2  | FFS1  | 0.000  | 0.000 | 15.000 | 0.00   | 1.525 | 55.95 |
| 3  | FFS2  | 0.000  | 0.000 | 19.200 | −50.00 | 1.525 | 55.95 |
| 4  | FFS3  | −4.432 | 0.000 | 19.981 | −85.00 | 1.525 | 55.95 |
| 5  | FFS2  | 0.000  | 0.000 | 19.200 | −50.00 |       |       |
| 6  | FFS4  | 0.000  | 0.000 | 19.400 | −50.00 | 1.525 | 55.95 |
| 7  | FFS5  | 7.784  | 0.000 | 24.428 | 0.00   | 1.525 | 55.95 |
| 8  | FFS6  | 15.772 | 0.000 | 21.521 | 35.00  | 1.525 | 55.95 |
| 9  | FFS5  | 7.784  | 0.000 | 24.428 | 0.00   |       |       |
| 10 | PLANE | 15.772 | 0.000 | 26.735 | 0.00   | 1.458 | 67.82 |
| 11 | IMAGE | 15.772 | 0.000 | 28.335 | 0.00   |       |       |

Regarding each optical surface in the light guiding member which constitutes the Example 1, the coefficient which is polynomially expanded on the free-form surface is illustrated in Table 2 described below. The coefficient $Ak_{m,n}$ means the coefficient of each term $x^m \cdot y^n$ which constitutes the polynomial expression which represents the k-th surface of interest. In addition, in Table 2, the symbol m,n means a variable or a degree in the coefficient $Ak_{m,n}$. In addition, the symbol FFSk (k=3 or 6) means the k-th surface among the third surface S13 and sixth surface S16 which are the free-form surfaces. In addition, regarding the local coordinates of each surface, the drawing which corresponds to the drawing illustrated in FIG. 2 will be omitted.

TABLE 2

| m | n | FFS3       | FFS6       |
|---|---|------------|------------|
| 2 | 0 | 7.472E−03  | 6.392E−03  |
| 0 | 2 | 8.055E−03  | 9.164E−03  |
| 3 | 0 | −1.563E−05 | −8.909E−05 |
| 1 | 2 | −2.655E−05 | 4.231E−04  |
| 4 | 0 | 3.162E−07  | −1.390E−04 |
| 2 | 2 | 3.377E−06  | 8.994E−06  |
| 0 | 4 | −2.358E−06 | −1.274E−04 |
| 5 | 0 | −1.877E−06 | 3.730E−05  |
| 3 | 2 | −1.648E−06 | 1.405E−06  |
| 1 | 4 | 1.341E−06  | 4.924E−06  |
| 6 | 0 | −1.285E−06 | 1.777E−05  |
| 4 | 2 | −1.151E−07 | 2.212E−07  |
| 2 | 4 | −3.189E−07 | 5.902E−06  |
| 0 | 6 | −5.115E−07 | 5.532E−05  |

In Table 2 above and the tables below, the numerical value after E means an exponent part of decimal digit, for example, "7.472E−03" means $7.472 \times 10^{-03}$.

Figure 4:
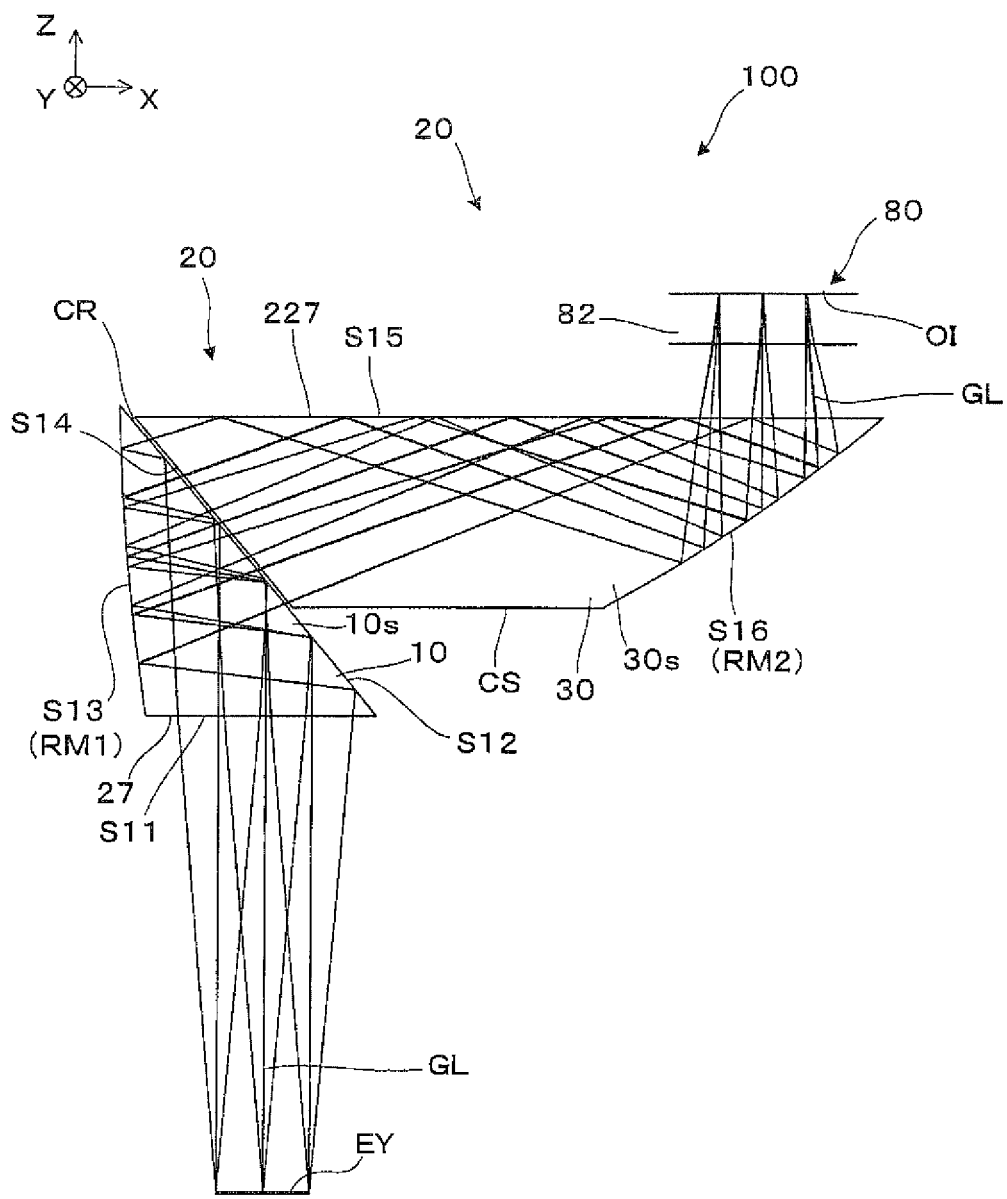
FIG. 4 is a view illustrating an optical system of Example 1.

FIG. 4 is cross-sectional view of the virtual image display apparatus of Example 1. The first prism 10 in the light guiding device 20 of the virtual image display apparatus 100 includes: the first surface S11 which does not have a refracting power; the second surface S12 which does not have a refracting power; and the third surface S13 which has a positive refracting power. Here, the second surface S12 functions as the reflecting surface and a transmitting surface. Specifically, the second surface S12 is the total reflecting surface with respect to the light flux (in practice, the light from the third surface S13) which moves backward from the first surface S11, and is the transmitting surface with respect to the light flux (in practice, the light from the second prism 30) which moves backward from the third surface S13. In other words, the second surface S12 has both a function of bending the optical path and a function (an inlet of the light flux, that is, an incident surface of the light flux) of making the luminous flux incident. The second prism 30 includes: the fourth surface S14 which does not have a refracting power; the fifth surface S15 which does not have a refracting power; and the sixth surface S16 which has a positive refracting power. Here, the fifth surface S15 functions as the reflecting surface and the transmitting surface. Specifically, the fifth surface S15 is the total reflecting surface with respect to the light flux (in practice, the light from the sixth surface S16) which moves backward from the fourth surface S14, and is the transmitting surface with respect to the light flux (in practice, the light from the video display element 82) which moves backward from the sixth surface S16. In other words, the fifth surface S15 has both a function of bending the optical path and a function (incident surface of the light flux) of making the luminous flux incident. If detailed specifications of the optical system of Example 1 are described, a horizontal angle of view is 10.0° and the vertical angle of view is 5.8°. The size of the display region of the video display element is 2.8×1.62 mm, a diameter of the pupil is 3.0 mm, and a focal length is approximately 16 mm.

Figure 5A:
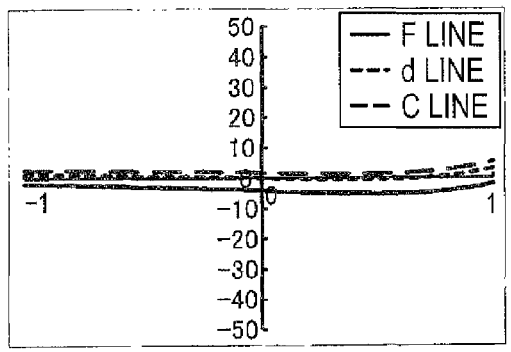
FIGS. 5A to 5F are views illustrating an aberration of the optical system of Example 1.
Figure 5D:
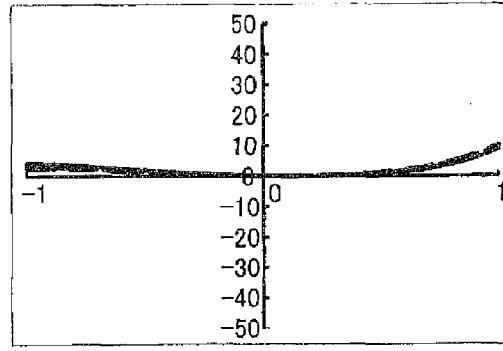
Figure 5B:
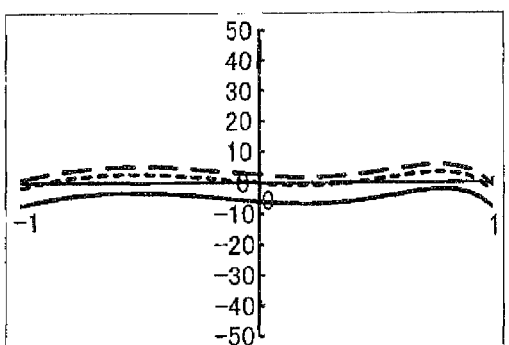
Figure 5E:
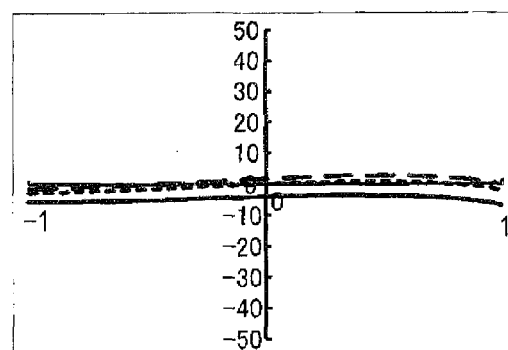
Figure 5C:
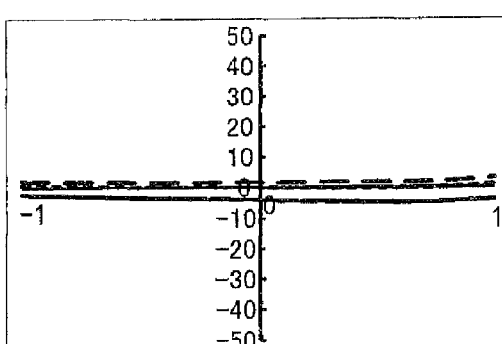
Figure 5F:
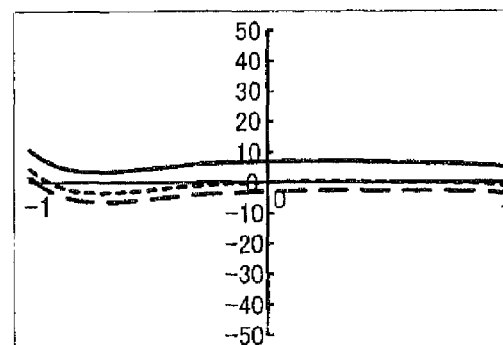
Figure 6A:
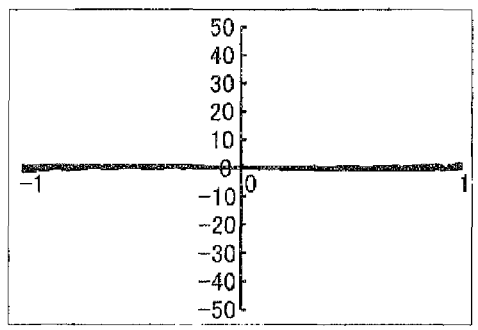
FIGS. 6A to 6F are views illustrating the aberration of the optical system of Example 1.
Figure 6D:
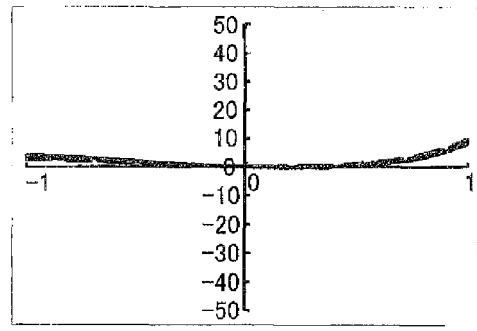
Figure 6B:
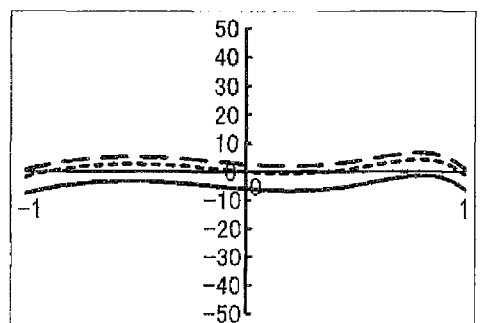
Figure 6E:
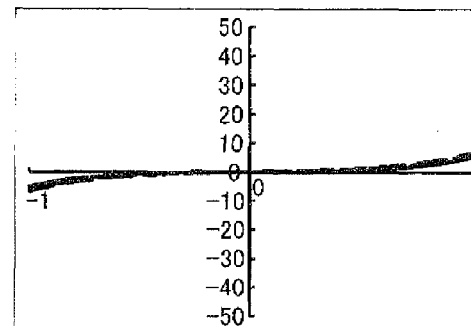
Figure 6C:
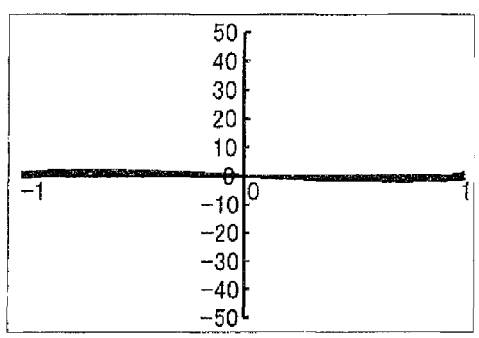
Figure 6F:
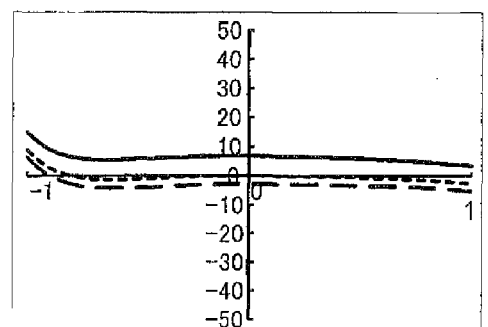

FIGS. 5A to 5F and FIGS. 6A to 6F illustrate the aberration of Example 1. In each aberration drawing, the horizontal axis illustrates the position in the pupil, and the vertical axis illustrates the aberration amount, in a unit of microns. Specifically, FIGS. 5A and 5B illustrate the aberration of the Y and the X directions when the X direction is at 5.0° and the Y direction is at 2.9° of orientation, FIGS. 5C and 5D illustrate the aberration of the Y and the X directions when the X direction is at 0.0° and the Y direction is at 2.9° of orientation, and FIGS. 5E and 5F illustrate the aberration of the Y and the X directions when the X direction is at −5.0° and the Y direction is at 2.9° of orientation. FIGS. 6A and 6B illustrate the aberration of the Y and the X directions when the X direction is at 5.0° and the Y direction is at 0.0° of orientation, FIGS. 6C and 6D illustrate the aberration of the Y and the X directions when the X direction is at 0.0° and the Y direction is at 0.0° of orientation, and FIGS. 62 and 6F illustrate the aberration of the Y and the X directions when the X direction is at −5.0° and the Y direction is at 0.0° of orientation. In addition, the aberration amounts illustrated in the drawings are the aberration amounts on an image surface of the video display element when the ray of light is made to move backward for convenience.

Example 2

Data of the optical surface which constitutes the light guiding member in Example 2 is illustrated in Table 3 described below. In addition, the symbol FFSk (k=3 or 6) means the third surface S13 and the sixth surface S16 which are the free-form surfaces.

TABLE 3

| No | Type | X | Y | Z | θ | Nd | Vd |
|---|---|---|---|---|---|---|---|
| 1 | EP | 0.000 | 0.000 | 0.000 | 0.00 | | |
| 2 | FFS1 | 0.000 | 0.000 | 15.000 | 0.00 | 1.525 | 55.95 |
| 3 | FFS2 | 0.000 | 0.000 | 19.200 | −50.00 | 1.525 | 55.95 |
| 4 | FFS3 | −4.432 | 0.000 | 19.981 | −85.00 | 1.525 | 55.95 |
| 5 | FFS2 | 0.000 | 0.000 | 19.200 | −50.00 | | |
| 6 | FFS4 | 0.000 | 0.000 | 19.400 | −50.00 | 1.525 | 55.95 |
| 7 | FFS5 | 2.146 | 0.000 | 22.376 | −20.00 | 1.525 | 55.95 |
| 8 | FFS6 | 4.396 | 0.000 | 18.478 | 5.00 | 1.525 | 55.95 |
| 9 | FFS5 | 2.146 | 0.000 | 22.376 | −20.00 | | |
| 10 | PLANE | 6.335 | 0.000 | 23.804 | −20.00 | 1.458 | 67.82 |
| 11 | IMAGE | 6.882 | 0.000 | 25.307 | −20.00 | | |

On each optical surface in the light guiding member which constitutes Example 2, the coefficient $Ak_{m,n}$ which is polynomially developed on the free-form surface is illustrated in Table 4 described below. The coefficient $Ak_{m,n}$ means the coefficient of each term $x^m \cdot y^n$ which constitutes the polynomial expression which represents the k-th surface (k=3 or 6) of interest.

TABLE 4

| m | n | FFS3 | FFS6 |
|---|---|---|---|
| 2 | 0 | 1.095E−02 | 4.286E−03 |
| 0 | 2 | 1.045E−02 | 1.057E−02 |
| 3 | 0 | −5.805E−05 | 1.224E−04 |
| 1 | 2 | −4.154E−05 | 3.624E−04 |
| 4 | 0 | −1.321E−06 | −2.131E−05 |
| 2 | 2 | −1.563E−06 | 2.699E−05 |
| 0 | 4 | −3.791E−06 | −5.197E−06 |
| 5 | 0 | −1.750E−06 | 2.775E−05 |
| 3 | 2 | −2.860E−06 | 1.873E−05 |
| 1 | 4 | 1.479E−06 | −1.217E−06 |
| 6 | 0 | −7.311E−07 | 1.191E−05 |
| 4 | 2 | −8.936E−08 | −1.692E−08 |
| 2 | 4 | −7.277E−07 | 5.845E−06 |
| 0 | 6 | −9.538E−07 | 1.296E−05 |

Figure 7:
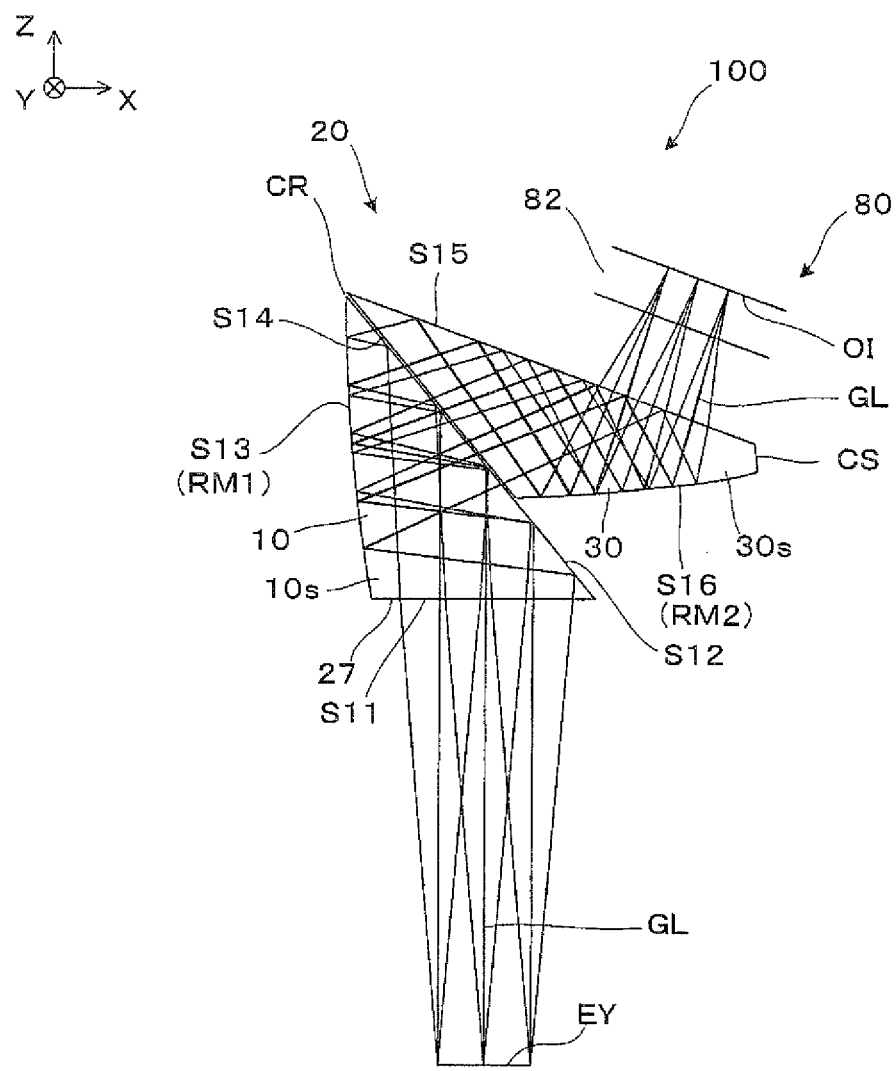
FIG. 7 is a view illustrating an optical system of Example 2.
Figure 8:
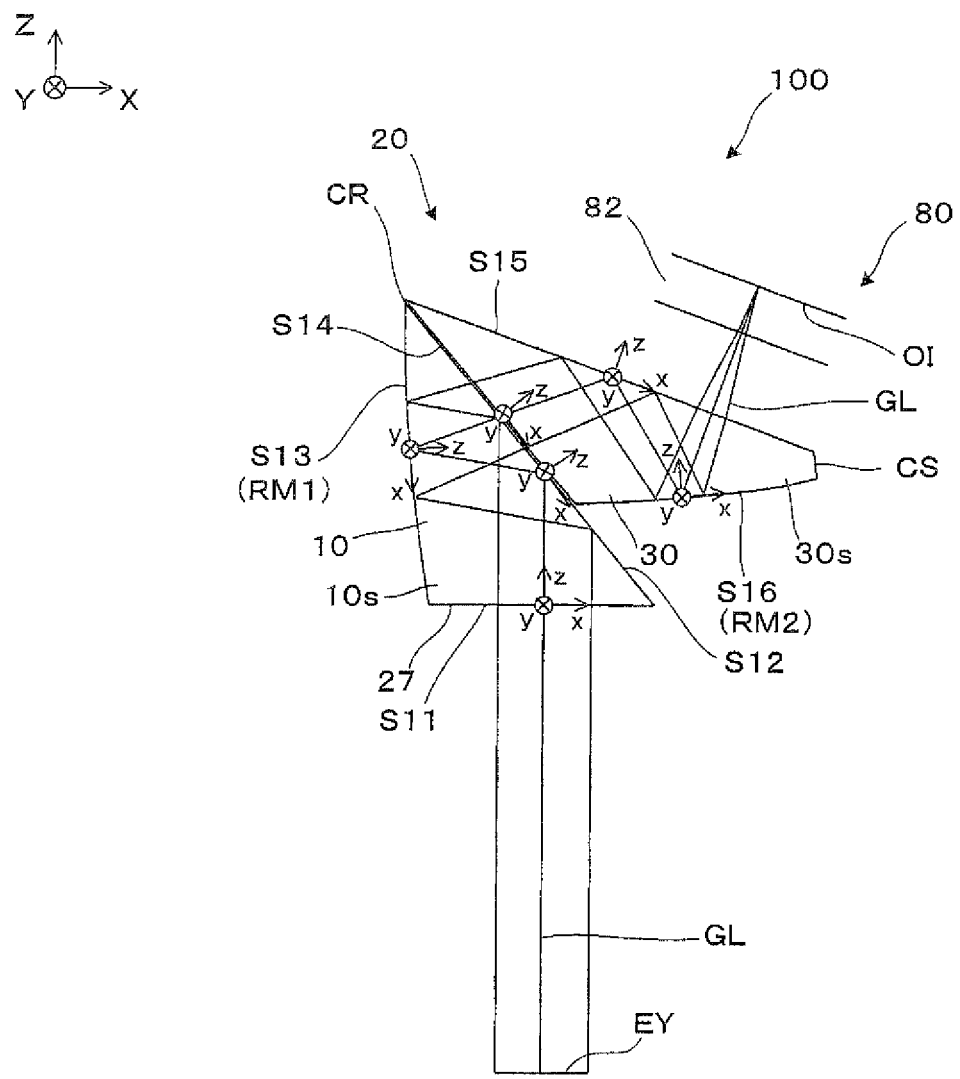
FIG. 8 is a cross-sectional view illustrating an optical surface or an optical path in a light guiding member of Example 2.

FIG. 7 is a cross-sectional view of the virtual image display apparatus in Example 2. In addition, FIG. 8 is a view illustrating the local coordinates in the light guiding member. The first prism 10 in the light guiding device 20 of the virtual image display apparatus 100 includes: the first surface S11 which does not have a refracting power; the second surface S12 which does not have a refracting power; and the third surface S13 which has a positive refracting power. Here, the second surface S12 functions as the reflecting surface and the transmitting surface. Specifically, the second surface S12 is the total reflecting surface with respect to the light flux (in practice, the light from the third surface S13) which moves backward from the first surface S11, and is the transmitting surface with respect to the light flux (in practice, the light from the second prism 30) which moves backward from the third surface S13. In other words, the second surface S12 has both a function of bending the optical path and a function (incident surface of the light flux) of making the luminous flux incident. The second prism 30 includes: the fourth surface S14 which does not have a refracting power; the fifth surface S15 which does not have a refracting power; and the sixth surface S16 which has a positive refracting power. Here, the fifth surface S15 functions as the reflecting surface and the transmitting surface. Specifically, the fifth surface S15 is the total reflecting surface with respect to the light flux (in practice, the light from the sixth surface S16) which moves backward from the fourth surface S14, and is the transmitting surface with respect to the light flux (in practice, the light from the video display element 82) which moves backward from the sixth surface S16. In other words, the fifth surface S15 has both a function of bending the optical path and a function of making the luminous flux incident. In addition, as illustrated in the drawings, the sixth surface S16 is sequentially adjacent to the fourth surface S14, and is connected to the fifth surface S15 via the connection surface CS. Therefore, it is possible to make a more compact design. If detailed specifications of the optical system of Example 2 are described, a horizontal angle of view is 10.0° and the vertical angle of view is 5.8°. The size of the display region of the video display element is 2.8×1.62 mm, a diameter of the pupil is 3.0 mm, and a focal length is approximately 16 mm.

Figure 9A:
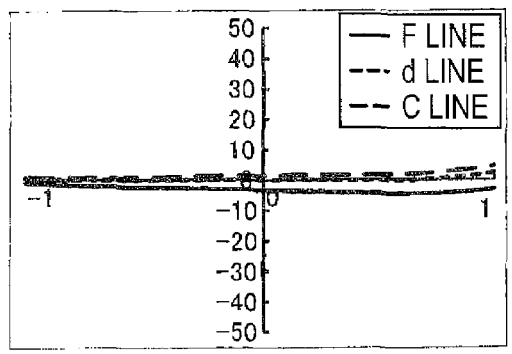
FIGS. 9A to 9F are views illustrating an aberration of the optical system of Example 2.
Figure 9D:
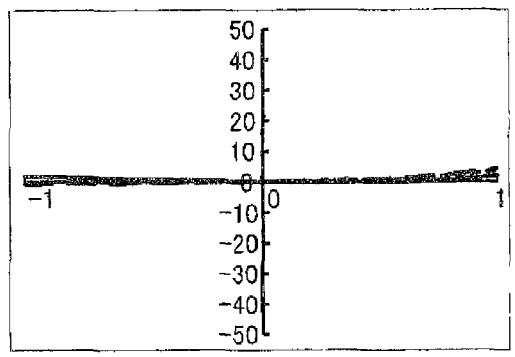
Figure 9B:
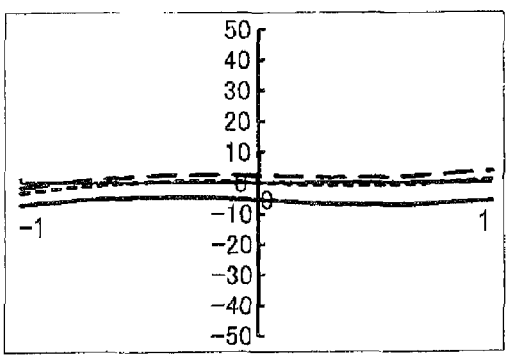
Figure 9E:
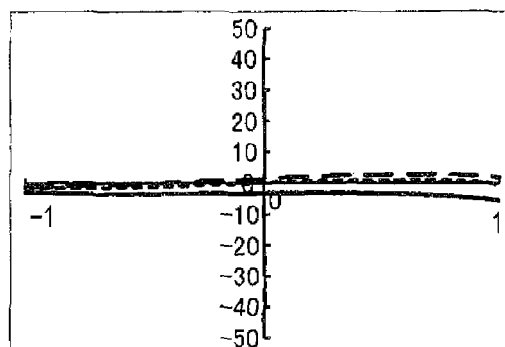
Figure 9C:
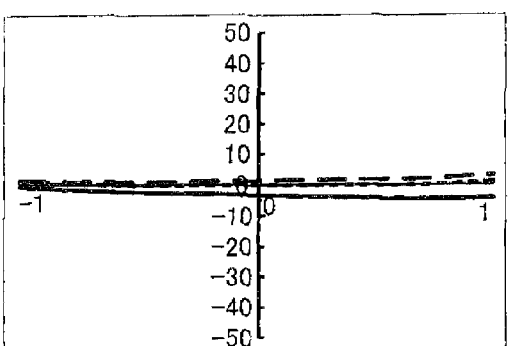
Figure 9F:
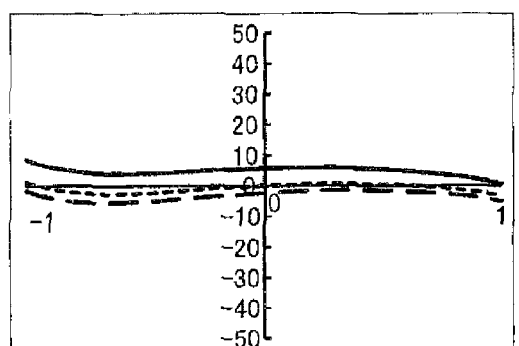
Figure 10A:
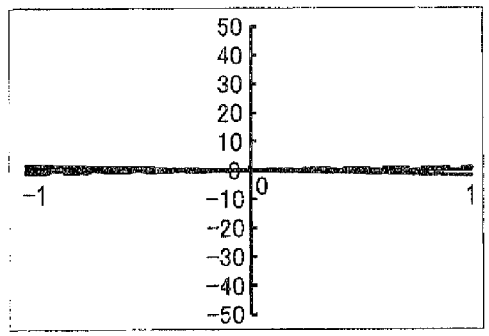
FIGS. 10A to 10F are views illustrating the aberration of the optical system of Example 2.
Figure 10D:
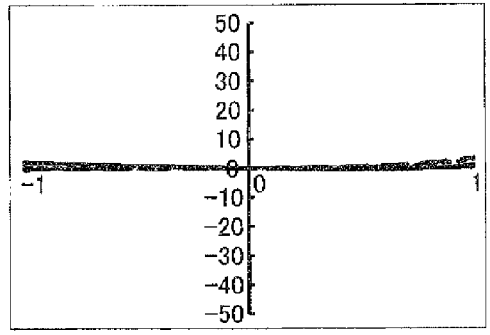
Figure 10B:
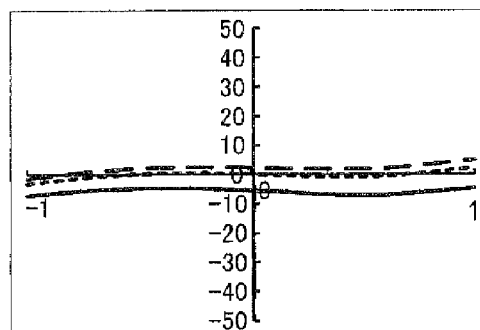
Figure 10E:
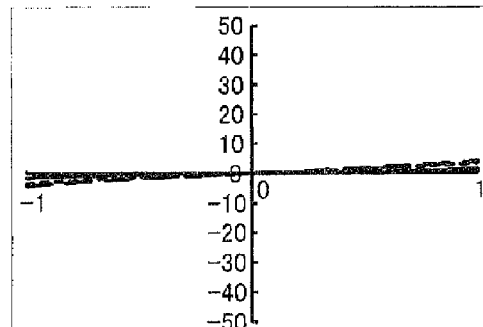
Figure 10C:
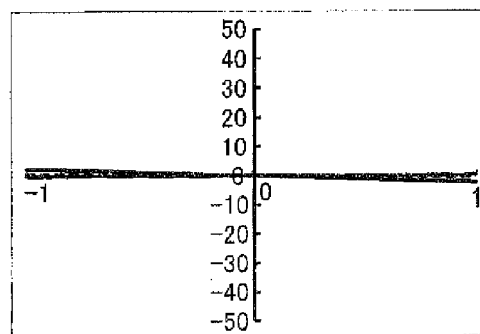
Figure 10F:
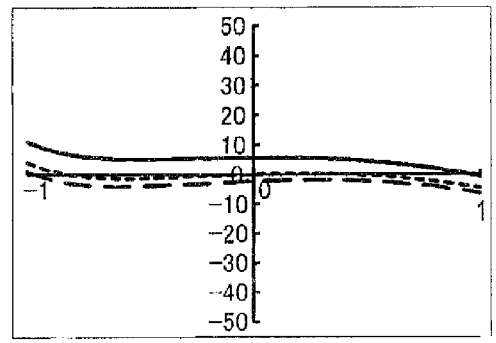

FIGS. 9A to 9F and FIGS. 10A to 10F illustrate the aberration of Example 2. In each aberration drawing, the horizontal axis illustrates the position in the pupil, and the vertical axis illustrates the aberration amount, in a unit of microns. Specifically, FIGS. 9A and 9B illustrate the aberration of the Y and the X directions when the X direction is at 5.0° and the Y direction is at 2.9° of orientation, FIGS. 9C and 9D illustrate the aberration of the Y and the X directions when the X direction is at 0.0° and the Y direction is at 2.9° of orientation, and FIGS. 9E and 9F illustrate the aberration of the Y and the X directions when the X direction is at −5.0° and the Y direction is at 2.9° of orientation. FIGS. 10A and 10B illustrate the aberration of the Y and the X directions when the X direction is at 5.0° and the Y direction is at 0.0° of orientation, FIGS. 10C and 10D illustrate the aberration of the Y and the X directions when the X direction is at 0.0° and the Y direction is at 0.0° of orientation, and FIGS. 10E and 10F illustrate the aberration of the Y and the X directions when the X direction is at −5.0° and the Y direction is at 0.0° of orientation. In addition, the aberration amounts illustrated in the drawings are the aberration amounts on the image surface of the video display element when the ray of light is made to move backward for convenience.

Example 3

Data of the optical surface which constitutes the light guiding member in Example 3 is illustrated in Table 5 described below. The symbol FFSk (k=3, 6, or 7) means the third surface S13, the sixth surface S16, or a seventh surface S17 which is the free-form surface.

TABLE 5

| No | Type  | X      | Y     | Z      | θ      | Nd    | Vd    |
|----|-------|--------|-------|--------|--------|-------|-------|
| 1  | EP    | 0.000  | 0.000 | 0.000  | 0.00   |       |       |
| 2  | FFS1  | 0.000  | 0.000 | 15.000 | 0.00   | 1.525 | 55.95 |
| 3  | FFS2  | 0.000  | 0.000 | 19.200 | −50.00 | 1.525 | 55.95 |
| 4  | FFS3  | −4.432 | 0.000 | 19.981 | −85.00 | 1.525 | 55.95 |
| 5  | FFS2  | 0.000  | 0.000 | 19.200 | −50.00 |       |       |
| 6  | FFS4  | 0.000  | 0.000 | 19.400 | −50.00 | 1.525 | 55.95 |
| 7  | FFS5  | 2.146  | 0.000 | 22.376 | −18.00 | 1.525 | 55.95 |
| 8  | FFS6  | 6.061  | 0.000 | 16.572 | −11.00 | 1.525 | 55.95 |
| 9  | FFS7  | 8.548  | 0.000 | 18.250 | −56.00 |       |       |
| 10 | PLANE | 10.608 | 0.000 | 19.640 | −56.00 | 1.458 | 67.82 |
| 11 | IMAGE | 11.935 | 0.000 | 20.535 | −56.00 |       |       |

On each optical surface in the light guiding member which constitutes Example 3, the coefficient $Ak_{m,n}$ which is polynomially developed on the free-form surface is illustrated in Table 6 described below. The coefficient $Ak_{m,n}$ means the coefficient of each term $x^m \cdot y^n$ which constitutes the polynomial expression which represents the k-th surface (k=3, 6, or 7) of interest.

TABLE 6

| m | n | FFS3       | FFS6       | FFS7       |
|---|---|------------|------------|------------|
| 2 | 0 | 9.488E−03  | 1.023E−02  | 1.081E−01  |
| 0 | 2 | 1.088E−02  | 8.997E−03  | 3.414E−02  |
| 3 | 0 | −5.447E−05 | 1.211E−03  | 2.245E−02  |
| 1 | 2 | 1.750E−05  | −3.987E−04 | −1.017E−02 |
| 4 | 0 | 8.142E−06  | 8.532E−05  | 2.710E−03  |
| 2 | 2 | 5.581E−06  | −1.304E−04 | −1.143E−03 |
| 0 | 4 | 3.579E−06  | −2.305E−05 | −4.166E−04 |
| 5 | 0 | 2.321E−07  | 0.000E+00  | 0.000E+00  |
| 3 | 2 | −1.428E−06 | 0.000E+00  | 0.000E+00  |
| 1 | 4 | −4.629E−07 | 0.000E+00  | 0.000E+00  |
| 6 | 0 | −2.066E−07 | 0.000E+00  | 0.000E+00  |
| 4 | 2 | 2.986E−07  | 0.000E+00  | 0.000E+00  |
| 2 | 4 | 1.797E−07  | 0.000E+00  | 0.000E+00  |
| 0 | 6 | −1.927E−07 | 0.000E+00  | 0.000E+00  |

Figure 11:
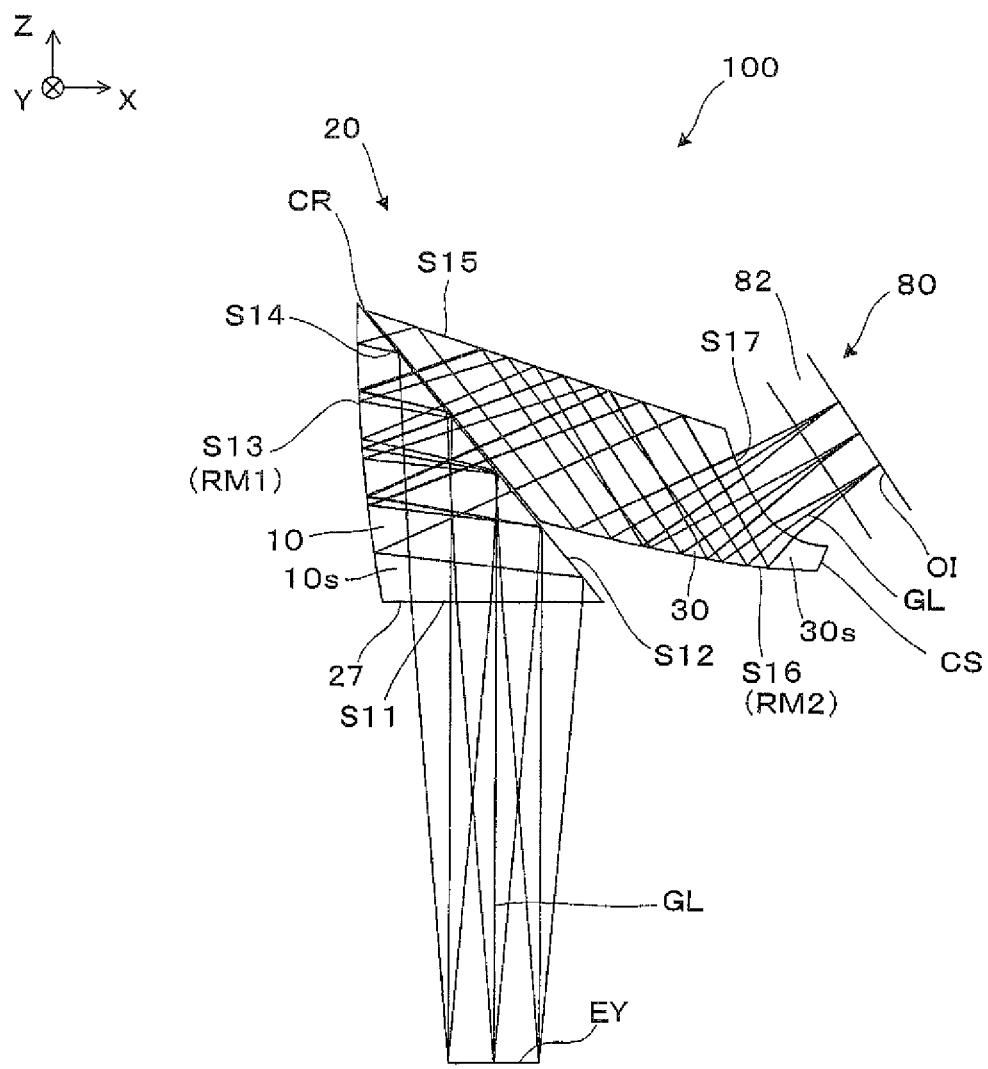
FIG. 11 is a view illustrating an optical system of Example 3.
Figure 12:
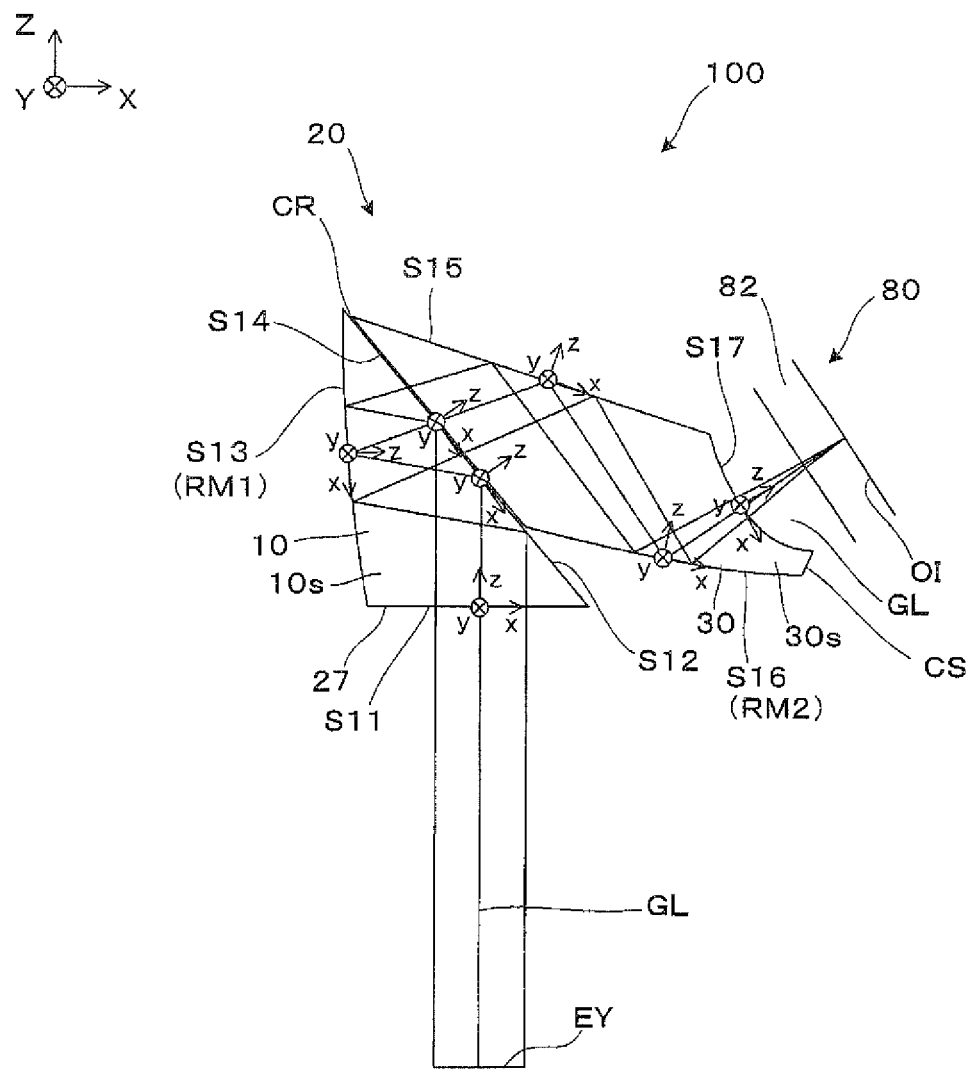
FIG. 12 is a cross-sectional view illustrating an optical surface or an optical path in a light guiding member of Example 3.

FIG. 11 is a cross-sectional view of the virtual image display apparatus of Example 3. In addition, FIG. 12 is a view illustrating the local coordinates in the light guiding member. The first prism 10 in the light guiding device 20 of the virtual image display apparatus 100 includes: the first surface S11 which does not have a refracting power; the second surface S12 which does not have a refracting power; and the third surface S13 which has a positive refracting power. Here, the second surface S12 functions as the reflecting surface and the transmitting surface. Specifically, the second surface S12 is the total reflecting surface with respect to the light flux (in practice, the light from the third surface S13) which moves backward from the first surface S11, and is the transmitting surface with respect to the light flux (in practice, the light from the second prism 30) which moves backward from the third surface S13. In other words, the second surface S12 has both a function of bending the optical path and a function of making the luminous flux incident. The second prism 30 includes: the fourth surface S14 which does not have a refracting power; the fifth surface S15 which does not have a refracting power; the sixth surface S16 which has a positive refracting power; and the seventh surface S17 which has a negative refracting power. The seventh surface S17 is the light incident surface, and the fifth surface S15 only functions as a surface which bends the optical path. In other words, the functions which are given to the fifth surface S15 in Example 1 or the like are divided between the fifth surface S15 and the seventh surface S17 in Example 3. If detailed specifications of the optical system of Example 3 are described, a horizontal angle of view is 10.0° and the vertical angle of view is 5.8°. The size of the display region of the video display element is 2.8×1.62 mm, a diameter of the pupil is 3.0 mm, and a focal length is approximately 16 mm.

Figure 13A:
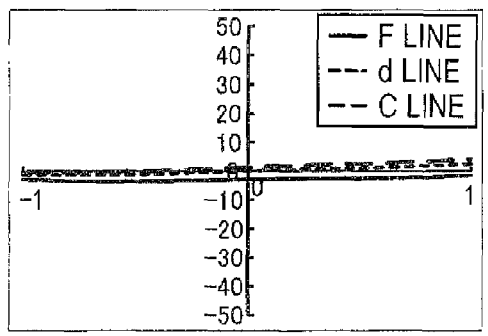
FIGS. 13A to 13F are views illustrating an aberration of the optical system of Example 3.
Figure 13D:
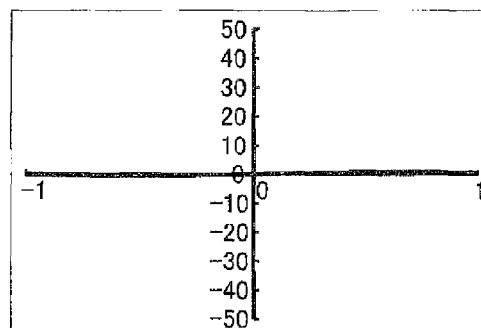
Figure 13B:
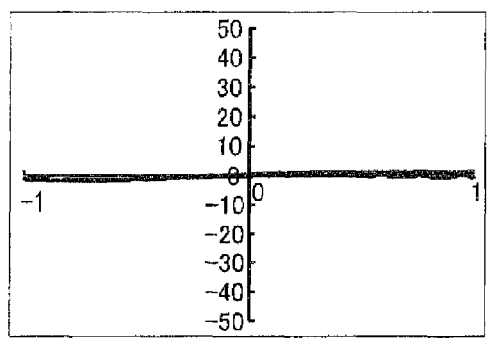
Figure 13E:
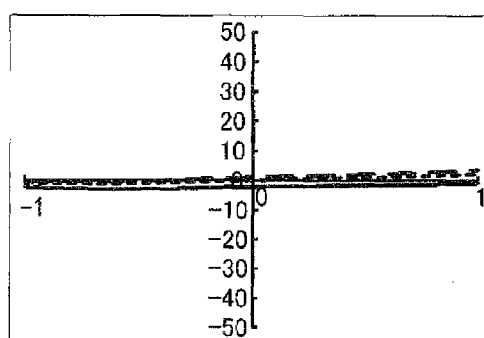
Figure 13C:
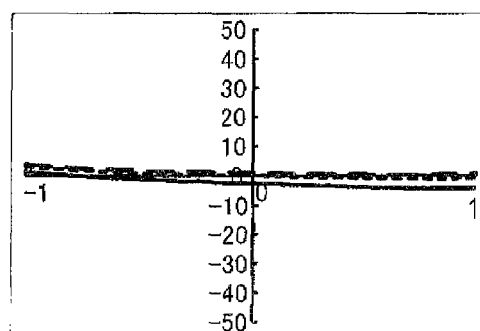
Figure 13F:
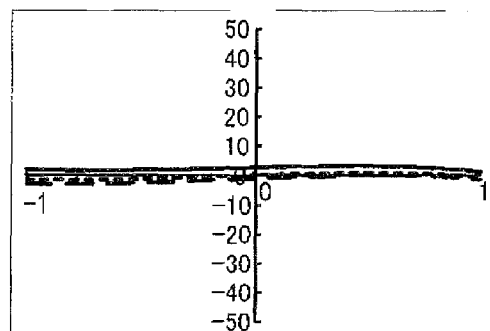
Figure 14A:
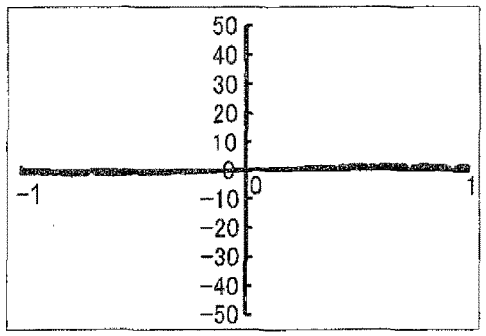
FIGS. 14A to 14F are views illustrating the aberration of the optical system of Example 3.
Figure 14D:
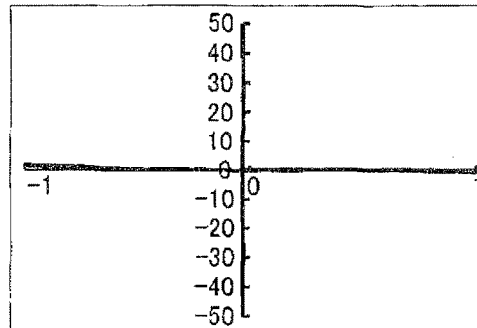
Figure 14B:
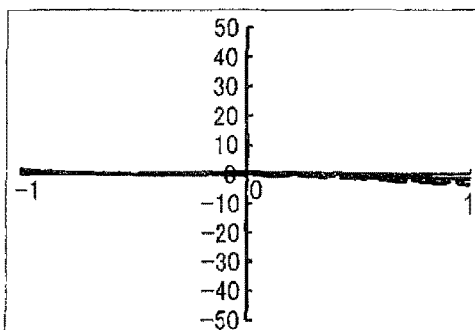
Figure 14E:
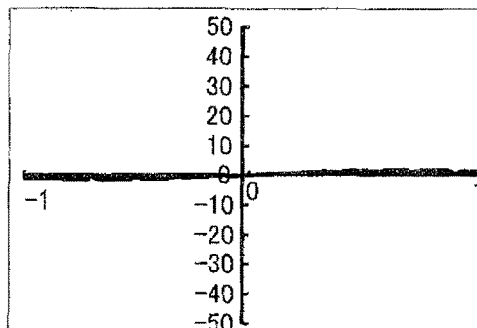
Figure 14C:
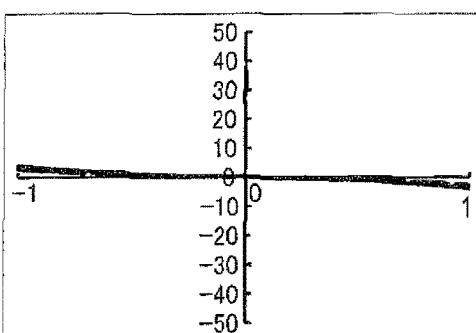
Figure 14F:
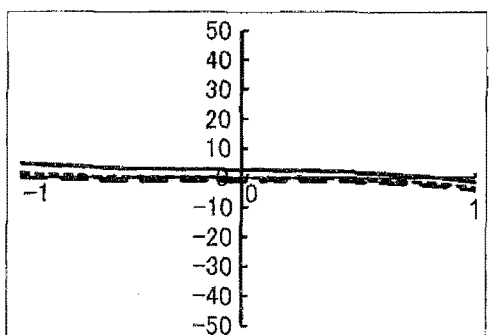

FIGS. 13A to 13F and FIGS. 14A to 14F illustrate the aberration of Example 3. In each aberration drawing, the horizontal axis illustrates the position in the pupil, and the vertical axis illustrates the aberration amount, in a unit of microns. Specifically, FIGS. 13A and 13B illustrate the aberration of the Y and the X directions when the X direction is at 5.0° and the Y direction is at 2.9° of orientation, FIGS. 13C and 13D illustrate the aberration of the Y and the X directions when the X direction is at 0.0° and the Y direction is at 2.9° of orientation, and FIGS. 13E and 13F illustrate the aberration of the Y and the X directions when the X direction is at −5.0° and the Y direction is at 2.9° of orientation. FIGS. 14A and 14B illustrate the aberration of the Y and the X directions when the X direction is at 5.0° and the Y direction is at 0.0° of orientation, FIGS. 14C and 14D illustrate the aberration of the Y and the X directions when the X direction is at 0.0° and the Y direction is at 0.0° of orientation, and FIGS. 14E and 14F illustrate the aberration of the Y and the X directions when the X direction is at −5.0° and the Y direction is at 0.0° of orientation. In addition, the aberration amounts illustrated in the drawings are the aberration amounts on the image surface of the video display element when the ray of light is made to move backward for convenience.

Example 4

Data of the optical surface which constitutes the light guiding member in Example 4 is illustrated in Table 7 described below. The symbol FFSk (k=3, 5, or 6) means the third surface S13, the fifth surface S15, or the sixth surface S16 which is the free-form surface.

TABLE 7

| No | Type  | X      | Y     | Z      | θ       | Nd    | Vd    |
|----|-------|--------|-------|--------|---------|-------|-------|
| 1  | EP    | 0.000  | 0.000 | 0.000  | 0.00    |       |       |
| 2  | FFS1  | 0.000  | 0.000 | 15.000 | 0.00    | 1.525 | 55.95 |
| 3  | FFS2  | 0.000  | 0.000 | 19.200 | −50.00  | 1.525 | 55.95 |
| 4  | FFS3  | −5.416 | 0.000 | 20.155 | −75.00  | 1.525 | 55.95 |
| 5  | FFS2  | 0.000  | 0.000 | 19.200 | −50.00  |       |       |
| 6  | FFS4  | 0.000  | 0.000 | 19.400 | −50.00  | 1.525 | 55.95 |
| 7  | FFS5  | −0.027 | 0.000 | 24.677 | −25.00  | 1.525 | 55.95 |
| 8  | FFS4  | 0.000  | 0.000 | 19.400 | −50.00  | 1.525 | 55.95 |
| 9  | FFS6  | 3.912  | 0.000 | 18.538 | −100.00 |       |       |
| 10 | PLANE | 6.493  | 0.000 | 18.083 | −100.00 | 1.458 | 67.82 |
| 11 | IMAGE | 8.068  | 0.000 | 17.805 | −100.00 |       |       |

On each optical surface in the light guiding member which constitutes Example 4, the coefficient $Ak_{m,n}$ which is polynomially developed on the free-form surface is illustrated in Table 8 described below. The coefficient $Ak_{m,n}$ means the coefficient of each term $x^n \cdot y^n$ which constitutes the polynomial expression which represents the k-th surface (k=3, 5, or 6) of interest.

TABLE 8

| m | n | FFS3 | FFS5 | FFS6 |
|---|---|------|------|------|
| 2 | 0 | 3.518E−03 | −1.277E−02 | 9.870E−02 |
| 0 | 2 | 7.823E−03 | −9.797E−03 | 5.446E−02 |
| 3 | 0 | 1.192E−04 | −7.418E−05 | 2.237E−03 |
| 1 | 2 | 1.338E−04 | 9.163E−05 | −3.711E−03 |
| 4 | 0 | −7.538E−05 | −1.229E−04 | 3.411E−03 |
| 2 | 2 | −1.385E−05 | −2.201E−05 | 1.176E−03 |
| 0 | 4 | 6.954E−06 | 9.682E−06 | 1.825E−03 |
| 5 | 0 | 4.598E−06 | 0.000E+00 | 6.520E−04 |
| 3 | 2 | 1.416E−06 | 0.000E+00 | −3.560E−04 |
| 1 | 4 | −1.171E−06 | 0.000E+00 | −3.270E−04 |
| 6 | 0 | −9.077E−07 | 0.000E+00 | 3.574E−03 |
| 4 | 2 | −6.167E−08 | 0.000E+00 | 1.680E−03 |
| 2 | 4 | −1.826E−07 | 0.000E+00 | −7.288E−04 |
| 0 | 6 | −5.057E−07 | 0.000E+00 | −1.053E−03 |

Figure 15:
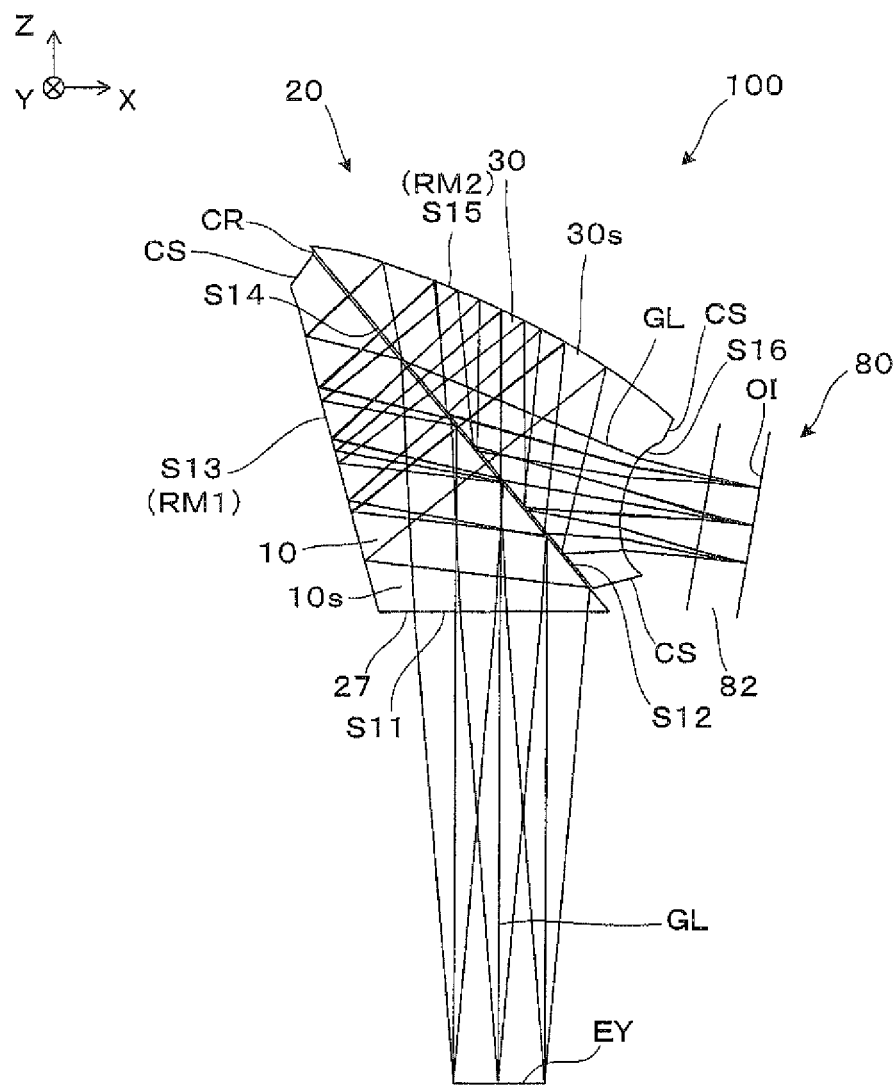
FIG. 15 is a view illustrating an optical system of Example 4.
Figure 16:
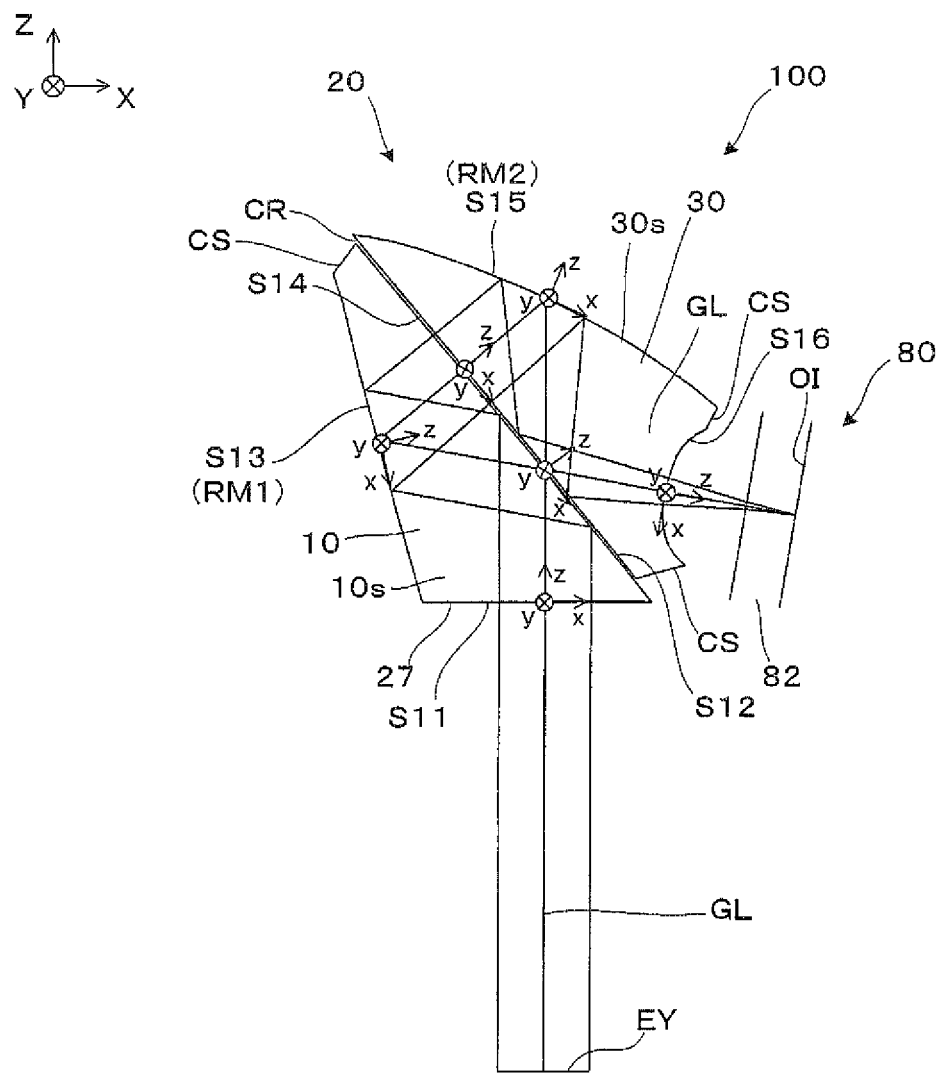
FIG. 16 is a cross-sectional view illustrating an optical surface or an optical path in a light guiding member of Example 4.

FIG. 15 is a cross-sectional view of the virtual image display apparatus of Example 4. In addition, FIG. 16 is a view illustrating the local coordinates in the light guiding member. The first prism 10 in the light guiding device 20 of the virtual image display apparatus 100 includes: the first surface S11 which does not have a refracting power; the second surface S12 which does not have a refracting power; and the third surface S13 which has a positive refracting power. Here, the second surface S12 functions as the reflecting surface and the transmitting surface. Specifically, the second surface S12 is the total reflecting surface with respect to the light flux (in practice, the light from the third surface S13) which moves backward from the first surface S11, and is the transmitting surface with respect to the light flux (in practice, the light from the second prism 30) which moves backward from the third surface S13. In other words, the second surface S12 has both a function of bending the optical path and a function of making the luminous flux incident. In addition, the second surface S12 and the third surface S13 are connected to each other via the connection surface CS. The second prism 30 includes: the fourth surface S14 which does not have a refracting power; the fifth surface S15 which has a positive refracting power; and the sixth surface S16 which has a negative refracting power. Here, the fourth surface S14 functions as the reflecting surface and the transmitting surface. Specifically, the fourth surface S14 is the transmitting surface with respect to the light flux (in practice, the light from the fifth surface S15) which moves backward from the first prism 10, and the fifth surface S15 is the total reflecting surface with respect to the light flux (in practice, the light from the sixth surface S16) which moves backward from the fifth surface S15. In other words, the fourth surface S14 has both a function of bending the optical path and a function (the outlet of the light flux, that is, the emitting surface of the light flux) of making the luminous flux incident. If detailed specifications of the optical system of Example 4 are described, a horizontal angle of view is 10.0° and the vertical angle of view is 5.8°. The size of the display region of the video display element is 2.8×1.62 mm, a diameter of the pupil is 3.0 mm, and a focal length is approximately 16 mm.

Figure 17A:
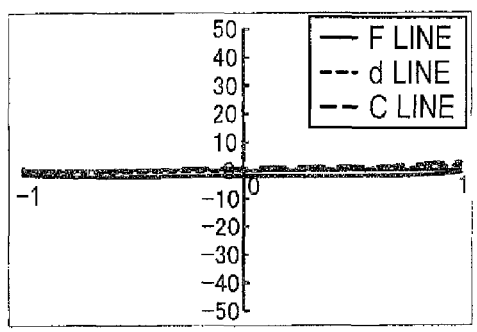
FIGS. 17A to 17F are views illustrating an aberration of the optical system of Example 4.
Figure 17D:
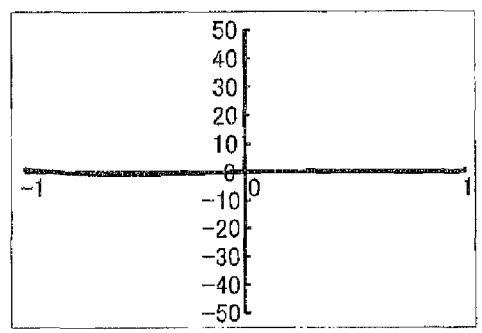
Figure 17B:
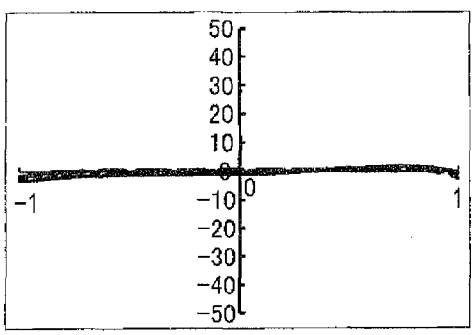
Figure 17E:
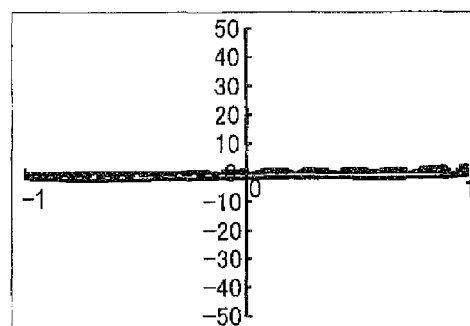
Figure 17C:
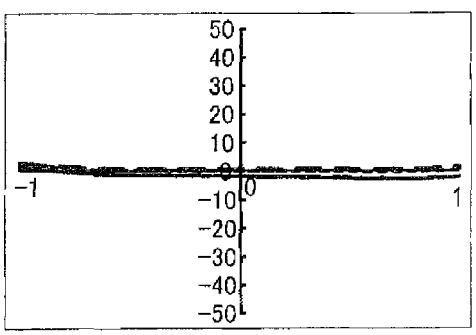
Figure 17F:
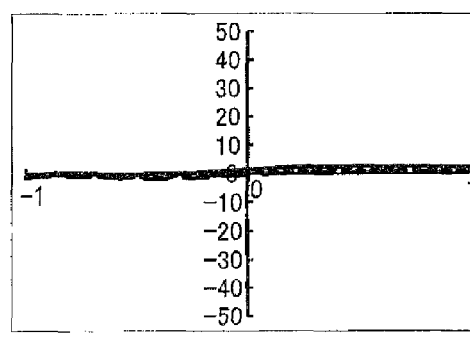
Figure 18A:
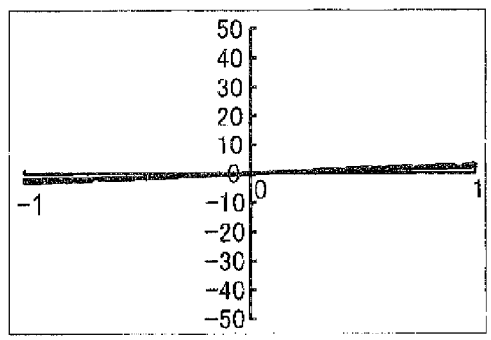
FIGS. 18A to 18F are views illustrating the aberration of the optical system of Example 4.
Figure 18B:
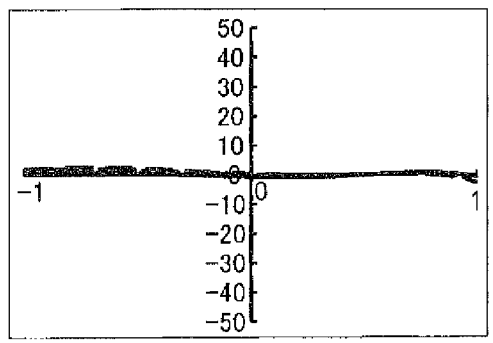
Figure 18C:
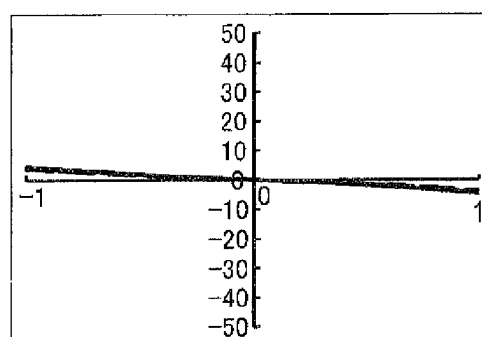
Figure 18D:
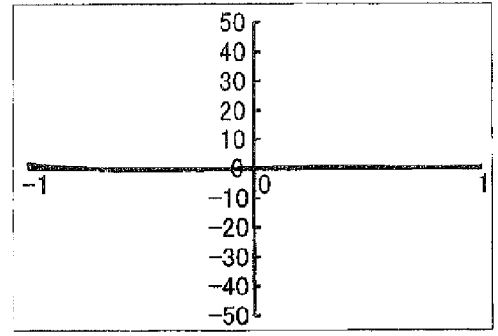
Figure 18E:
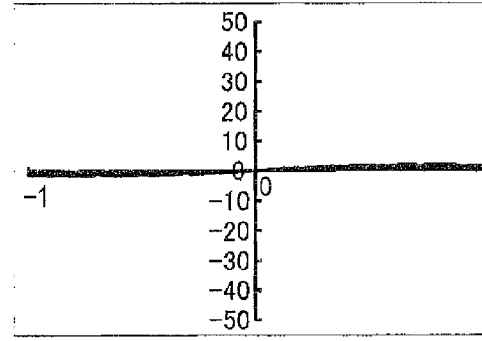
Figure 18F:
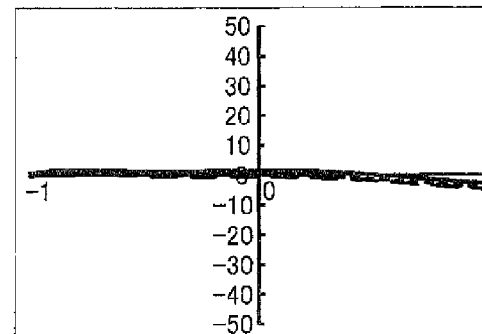

FIGS. 17A to 17F and FIGS. 18A to 18F illustrate the aberration of Example 4. In each aberration drawing, the horizontal axis illustrates the position in the pupil, and the vertical axis illustrates the aberration amount, in a unit of microns. Specifically, FIGS. 17A and 17B illustrate the aberration of the Y and the X directions when the X direction is at 5.0° and the Y direction is at 2.9° of orientation, FIGS. 17C and 17D illustrate the aberration of the Y and the X directions when the X direction is at 0.0° and the Y direction is at 2.9° of orientation, and FIGS. 17E and 17F illustrate the aberration of the Y and the X directions when the X direction is at −5.0° and the Y direction is at 2.9° of orientation. FIGS. 18A and 18B illustrate the aberration of the Y and the X directions when the X direction is at 5.0° and the Y direction is at 0.0° of orientation, FIGS. 18C and 18D illustrate the aberration of the Y and the X directions when the X direction is at 0.0° and the Y direction is at 0.0° of orientation, and FIGS. 18E and 18F illustrate the aberration of the Y and the X directions when the X direction is at −5.0° and the Y direction is at 0.0° of orientation. In addition, the aberration amounts illustrated in the drawings are the aberration amounts on the image surface of the video display element when the ray of light is made to move backward for convenience.

In addition, in the embodiment, the third surface S13 of the first prism 10 and the sixth surface S16 of the second prism satisfy the following two conditions.

$$10^{-3} < A3_{0,2} + A3_{2,0} < 10^{-1} \text{ and}$$

$$10^{-3} < -A5_{0,2} - A5_{2,0} < 10^{-1} \quad (3)$$

$$10^{-4} < |A3_{2,0} - A3_{0,2}| < 10^{-2} \text{ and}$$

$$10^{-4} < |A5_{2,0} - A5_{0,2}| < 10^{-2} \quad (4)$$

As the shape of the first to the sixth surfaces S11 to S16 is set to satisfy the two conditions, it is possible to perform the correction of the aberration of the video light GL well, and to achieve an excellent image quality.

In Table 9 described below, regarding each Example 1 to 4, the values with regard to the coefficient $Ak_{m,n}$ and the numerical data with regard to the condition expressions (1) to (4) are summarized. It is found that, by the data described below, for example, Examples 1 to 3 satisfy the condition expressions (1) and (2), and Example 4 satisfies the condition expressions (3) and (4).

TABLE 9

| Coefficient value or condition value | Example 1 | Example 2 | Example 3 |
|---|---|---|---|
| $A3_{2,0}$ | 7.47E−03 | 1.09E−02 | 9.49E−03 |
| $A3_{0,2}$ | 8.05E−03 | 1.05E−02 | 1.09E−02 |
| $A6_{2,0}$ | 6.39E−03 | 4.29E−03 | 1.02E−02 |
| $A6_{0,2}$ | 9.16E−03 | 1.06E−02 | 9.00E−03 |
| $A3_{2,0} + A3_{0,2}$ | 1.55E−02 | 2.14E−02 | 2.04E−02 |
| $A6_{2,0} + A6_{0,2}$ | 1.56E−02 | 1.49E−02 | 1.92E−02 |
| $|A3_{2,0} - A3_{0,2}|$ | 5.82E−04 | 4.96E−04 | 1.39E−03 |
| $|A6_{2,0} - A6_{0,2}|$ | 2.77E−03 | 6.28E−03 | 1.24E−03 |

| Coefficient value or condition value | Example 4 |
|---|---|
| $A3_{2,0}$ | 3.52E−03 |
| $A3_{0,2}$ | 7.82E−03 |
| $A5_{2,0}$ | −1.28E−02 |
| $A5_{0,2}$ | −9.80E−03 |
| $A3_{2,0} + A3_{0,2}$ | 1.13E−02 |
| $-A5_{2,0} - A5_{0,2}$ | 2.26E−02 |
| $|A3_{2,0} - A3_{0,2}|$ | 4.31E−03 |
| $|A5_{2,0} - A5_{0,2}|$ | 2.98E−03 |

Other

The invention is described according to each of the above-described embodiments, but the invention is not limited to the above-described embodiments. Various embodiments are possible without departing from the scope of the invention. For example, a modification as follows is possible.

In the description above, in each Example, the surfaces (for example, the first surface S11, the second surface S12, the fourth surface S14, and the fifth surface S15 of Example 1) which are planes can be the curved surfaces (the surfaces may be a spherical surface, a curved surface which is symmetrical with respect to an axis, and a curved surface which is asymmetrical with respect to an axis).

In the description above, the distribution of display luminance is not particularly adjusted in the video display element 82, but in a case where a luminance difference is generated according to the position, it is possible to unevenly adjust the distribution of the display luminance.

In the description above, the video display element 82 which is formed of a transmission type liquid crystal display device or the like is used as the image display device 80. However, as the image display device 80, it is possible to use various members without limiting to the video display element 82 which is formed of the transmission type liquid crystal display device or the like. For example, a configuration in which a reflection type liquid crystal display device is used is also possible, and a digital micromirror device or the like can also be used instead of the video display element 82 which is formed of the liquid crystal display device or the like. In addition, it is possible to use a self-luminous type element which is represented by an LED array or an OLED (organic EL), as the image display device 80.

In the above-described embodiment, the image display device 80 which is formed of the transmission type liquid crystal display device or the like is used, but instead, it is possible to use a scanning type image display device.

Figure 19:
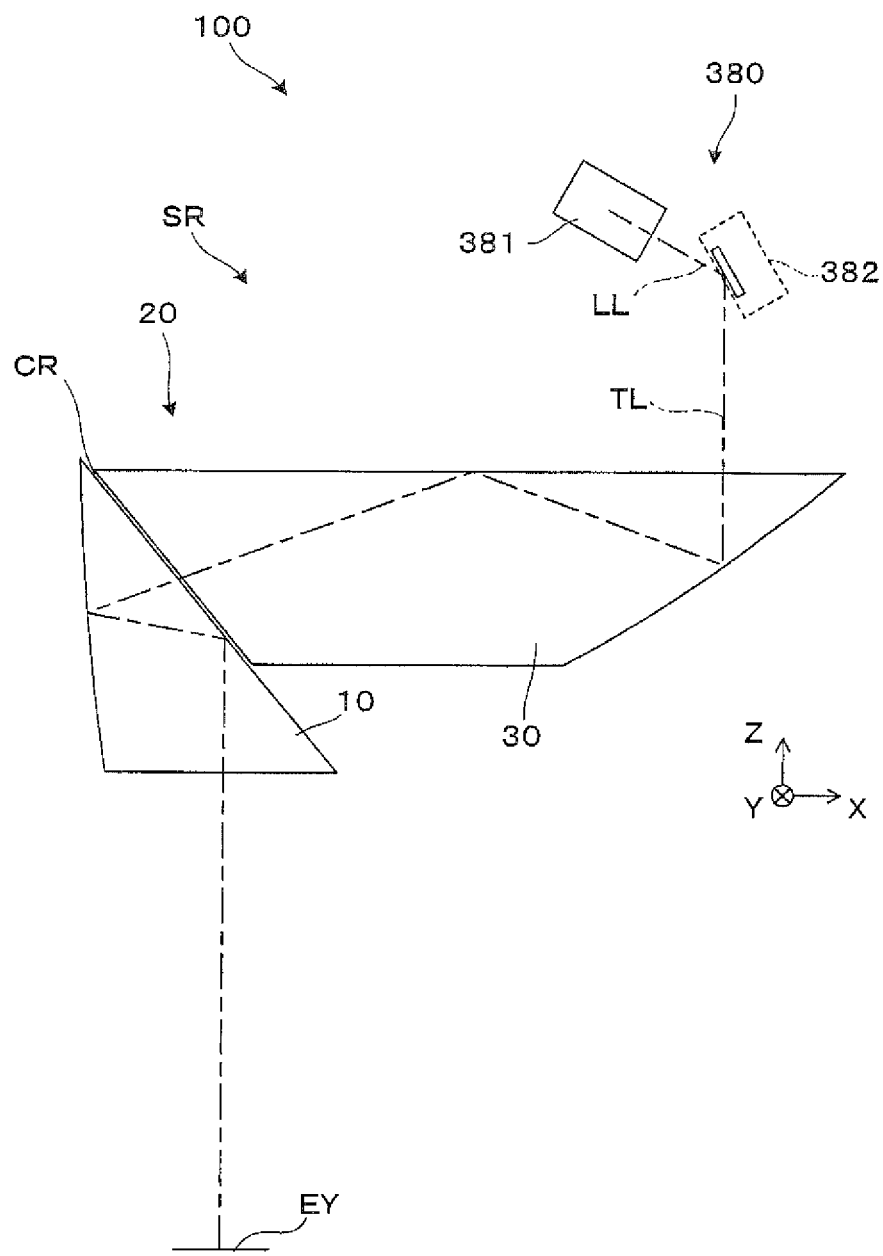
FIG. 19 is a view illustrating a virtual image display apparatus of a modification example.

Specifically, as illustrated in FIG. 19, the virtual image display apparatus 100 is provided with the light guiding device 20 and an image display device 380. Since the light guiding device 20 corresponds to a device configured by the first prism 10 and the second prism 30, the description thereof is omitted here. The image display device 380 is a device which forms an intensity-modulated signal light and emits the signal light as a scanning light TL, and has a signal light forming portion 381 and a scanning optical system 382.

The signal light forming portion 381 has the light source and emits a signal light LL which is formed to be modulated based on a control signal from a control circuit (not illustrated). The scanning optical system 382 scans and emits the signal light LL via the signal light forming portion 381. Here, the scanning optical system 382 is configured by a MEMS mirror or the like, and performs a two-dimensional scanning which changes an emission angle of the ray of light (scanning light TL) vertically and horizontally by changing a posture to be synchronized with the modulation of the signal light LL by the signal light forming portion 381 and adjusting the optical path of the signal light LL. According to the above, the image display device 380 causes the scanning light TL which is to be the video light GL to be incident on the light guiding device 20.

When the operation of the virtual image display apparatus 100 illustrated in the drawing is described, as described above, the image display device 380 emits the signal light LL as the scanning light TL toward the third surface S13 which functions as the light incident surface of the light guiding device 20. The second prism 30 in the light guiding device 20 guides the scanning light TL passing through the fifth surface S15 which functions as the light incident surface, on the inside, and emits the light toward the first prism 10. Furthermore, the first prism 10 guides the scanning light TL passing through the second surface S12 which functions as the light incident surface, on the inside by the total reflection or the like. At this time, for example, as the scanning light TL is scanned on a surface of a region which functions as the total reflecting surface of the video light on the second surface S12, a virtual image is formed by the video light GL as a track of the scanning light TL. As the wearer obtains the virtual image with the eyes EY, the image is recognized.

In the above-described description, a configuration in which the image is viewed with one eye is described. However, it is possible to provide a configuration in which a pair of right and left display devices is provided. In other words, corresponding to both the right eye and the left eye, the light guiding device 20 and the image display device 80 may be provided as one group.

In the above-described description, on the second surface S12 and the fifth surface S15 of the first prism 10 and the second prism 30 which are the light guiding members, the video light is totally reflected and guided by an interface with the air without implementing a mirror or a half mirror on the surface. However, the total reflection in the virtual image display apparatus 100 according to the invention includes a reflection which is performed by forming a mirror coat film or a half mirror film on the entirety or a part of the second surface S12 or the fifth surface S15. Examples thereof include even a case where the mirror coat or the like is implemented on the entirety or a part of the above-described second surface S12 or the fifth surface S15, and the total image light is substantially reflected, after the incident angle of the image light satisfies the total reflection conditions. In addition, if the image light having a sufficient brightness is obtained, the entirety or a part of the second surface S12 or the fifth surface S15 may be coated by the mirror which has a transparency to a certain extent.

In the description above, the first prism 10 or the like which is the light guiding member extends in the horizontal direction in which the eyes EY are aligned, but can be disposed so that the light guiding member extends in the vertical direction. In this case, the light guiding member has a structure in which the light guiding member is disposed in parallel, not in series.

The entire disclosure of Japanese Patent Application No. 2013-249856, filed Dec. 3, 2013 is expressly incorporated by reference herein.

What is claimed is:

1. A virtual image display apparatus, comprising:
   a video element which generates video light;
   a light guiding device including a first light guiding member which emits the video light to an observer side; and a second light guiding member which is disposed between the video element and the first light guiding member; and
   a clearance between a second surface which functions as a light incident surface of the first light guiding member and a light emitting surface of the second light guiding member,
   wherein, in the light guiding device, the first light guiding member and the second light guiding member respectively have one or more reflecting surfaces which are asymmetrical with respect to an axis and one or more total reflecting surfaces,
   the video light from the video element is emitted from the second light guiding member and is incident on the first light guiding member, after being reflected a plurality of times in the second light guiding member,
   the first light guiding member has at least three surfaces including a first surface, the second surface, and a third surface, as surfaces which contribute to guiding the video light, reflects the video light incident from the second surface that functions as the total reflecting surface on the third surface that functions as the reflecting surface which is asymmetrical with respect to an axis, totally reflects the video light on the second surface, transmits the video light onto the first surface, and makes the video light reach the eyes of the observer, the second surface of the first light guiding member and the light emitting surface of the second light guiding member being both planner surfaces and extending in parallel with each other, the clearance between the second surface which functions as the light incident surface of the first light guiding member and the light emitting surface of the second light guiding member is equal to or greater than 0.1 mm, and an interval between an emitting surface of the first light guiding member and the pupil of the observer is equal to or greater than 10 mm.

2. The virtual image display apparatus according to claim 1,
wherein the light guiding device makes a virtual image without forming an intermediate image.

3. The virtual image display apparatus according to claim 1,
wherein the second light guiding member has at least three surfaces including the light emitting surface, a fifth surface, and a sixth surface, as surfaces which contribute to guiding the video light, reflects the video light incident from the fifth surface which functions as the total reflecting surface on the sixth surface which functions as the reflecting surface which is asymmetrical with respect to an axis, totally reflects the video light on the fifth surface, transmits the video light onto the light emitting surface, and causes the video light to be incident on the first light guiding member.

4. The virtual image display apparatus according to claim 1,
wherein the second light guiding member has at least four surfaces including the light emitting surface, a fifth surface, a sixth surface and a seventh surface, as the surfaces which contribute to guiding the video light, reflects the video light incident from the seventh surface on the sixth surface which functions as the reflecting surface which is asymmetrical with respect to an axis, reflects the video light on the fifth surface which functions as the reflecting surface, transmits the video light onto the light emitting surface, and causes the video light to be incident on the first light guiding member.

5. The virtual image display apparatus according to claim 1,
wherein, when an origin of each surface that constitutes the light guiding member is a reference, a y is a direction which is orthogonal to a predetermined symmetrical plane by taking orthogonal coordinates x and y in a straight line direction, and an expression of a z in a surface shape with respect to the x and the y is polynomially expanded, as a coefficient of a term $x^m \cdot y^n$ of the polynomial expression which represents the k-th surface is $Ak_{m,n}$, the following condition is satisfied, $$10^{-3} < A3_{0,2} + A3_{2,0} < 10^{-1}, \text{ and}$$

$$10^{-3} < A6_{0,2} + A6_{2,0} < 10^{-1},$$

wherein k, m and n are integers and $Ak_{m,n}$ are real members.

6. The virtual image display apparatus according to claim 5,
wherein, with respect to the coefficient $Ak_{m,n}$ of the polynomial expression, the following condition is satisfied, $$10^{-4} < |A3_{2,0} - A3_{0,2}| < 10^{-2}, \text{ and}$$

$$10^{-4} < |A6_{2,0} - A6_{0,2}| < 10^{-2}.$$

7. The virtual image display apparatus according to claim 1,
wherein the second light guiding member has at least three surfaces including the light emitting surface, a fifth surface, and a sixth surface, as surfaces which contribute to guiding the video light, totally reflects the video light incident from the sixth surface on the light emitting surface which functions as the total reflecting surface, reflects the video light on the fifth surface which functions as the reflecting surface which is asymmetrical with respect to an axis, transmits the video light onto the light emitting surface, and causes the video light to be incident on the first light guiding member.

8. The virtual image display apparatus according to claim 1,
wherein, when an origin of each surface that constitutes the light guiding member is a reference, a y is a direction which is orthogonal to a predetermined symmetrical plane by taking orthogonal coordinates x and y in a straight line direction, and an expression of a z in a surface shape with respect to the x and the y is polynomially expanded, as a coefficient of a term $x^m \cdot y^n$ of the polynomial expression which represents the k-th surface is $Ak_{m,n}$, the following condition is satisfied, $$10^{-3} < A3_{0,2} + A3_{2,0} < 10^{-1}, \text{ and}$$

$$10^{-3} < -A5_{0,2} - A5_{2,0} < 10^{-1},$$

wherein k, m and n are integers and $Ak_{m,n}$ are real members.

9. The virtual image display apparatus according to claim 8,
wherein, with respect to the coefficient $Akm,n$ of the polynomial expression, the following condition is satisfied, $$10^{-4} < |A32,0 - A30,2| < 10^{-2}, \text{ and}$$

$$10^{-4} < |A52,0 - A50,2| < 10^{-2}.$$

10. The virtual image display apparatus according to claim 1,
wherein, in the first light guiding member, the third surface which functions as the reflecting surface which is asymmetrical with respect to an axis is an aluminum vapor deposition surface.

11. The virtual image display apparatus according to claim 1,
wherein an entire optical system including the first light guiding member and the second light guiding member covers a part of the front of the eyes of the observer when the apparatus is mounted, and there exists a part in which the front of the eyes is not covered.

12. The virtual image display apparatus according to claim 1,
wherein the video element includes: a signal light forming portion which emits modulated signal light corresponding to an image; and a scanning optical system which emits the signal light which is incident from the signal light forming portion as scanning light by scanning the signal light.

\* \* \* \* \*